United States Patent [19]
Ball et al.

[11] 3,718,988
[45] March 6, 1973

[54] TARGET GENERATOR

[75] Inventors: Lloyd D. Ball, Santa Monica; Clifford K. Friend, Woodland Hills; Lynn E. Schneider, Simi, all of Calif.

[73] Assignee: Sterling Laboratories, a division of Sterling Scientific Industries, Westlake Village, Calif.

[22] Filed: July 1, 1970

[21] Appl. No.: 51,614

[52] U.S. Cl. ................................................. 35/10.4
[51] Int. Cl. ............................................... G01s 9/00
[58] Field of Search ..................... 35/10.4; 343/17.7

[56] References Cited

UNITED STATES PATENTS

| | | | |
|---|---|---|---|
| 3,313,876 | 4/1967 | Freeborn | 35/10.4 |
| 2,889,635 | 6/1959 | Johnson | 35/10.4 |
| 2,555,442 | 6/1951 | Hales | 35/10.4 |

*Primary Examiner*—Stephen C. Bentley
*Attorney*—Fraser & Bogucki

[57] ABSTRACT

A target generator for simulation of images on a radar display is provided. The target generator which is of compact size and light weight employs heading and bearing and range computers utilizing step motors to drive potentiometers, resulting in drift-free operation and the ability to interrupt a training exercise for instructor critique. Computation of bearing and range is accomplished by initially determining from X and Y position signals the particular one of four different quadrants into which the bearing falls, and thereafter driving a step motor and associated potentiometers according to the quadrant determination. The precise range and bearing are determined by balancing the first set of X and Y position signals against a second set of generated X and Y position signals. The target generator provides for highly realistic target simulation by converting synchro data from a radar antenna assembly or radar antenna simulator into sine and cosine components to achieve angle gating and through use of wind simulation, target amplitude scintillation, IF gain controls and IFF interrogation. The target generator is further arranged so as to provide both long range or ASR and short range or PAR signals simultaneously and independently using PAR antenna servo controls. Flexibility in the use of the target generator with a wide variety of different radar types is provided by use of a separate interface junction box to couple the target generator between the radar antenna assembly or radar antenna simulator and the radar indicator.

46 Claims, 16 Drawing Figures

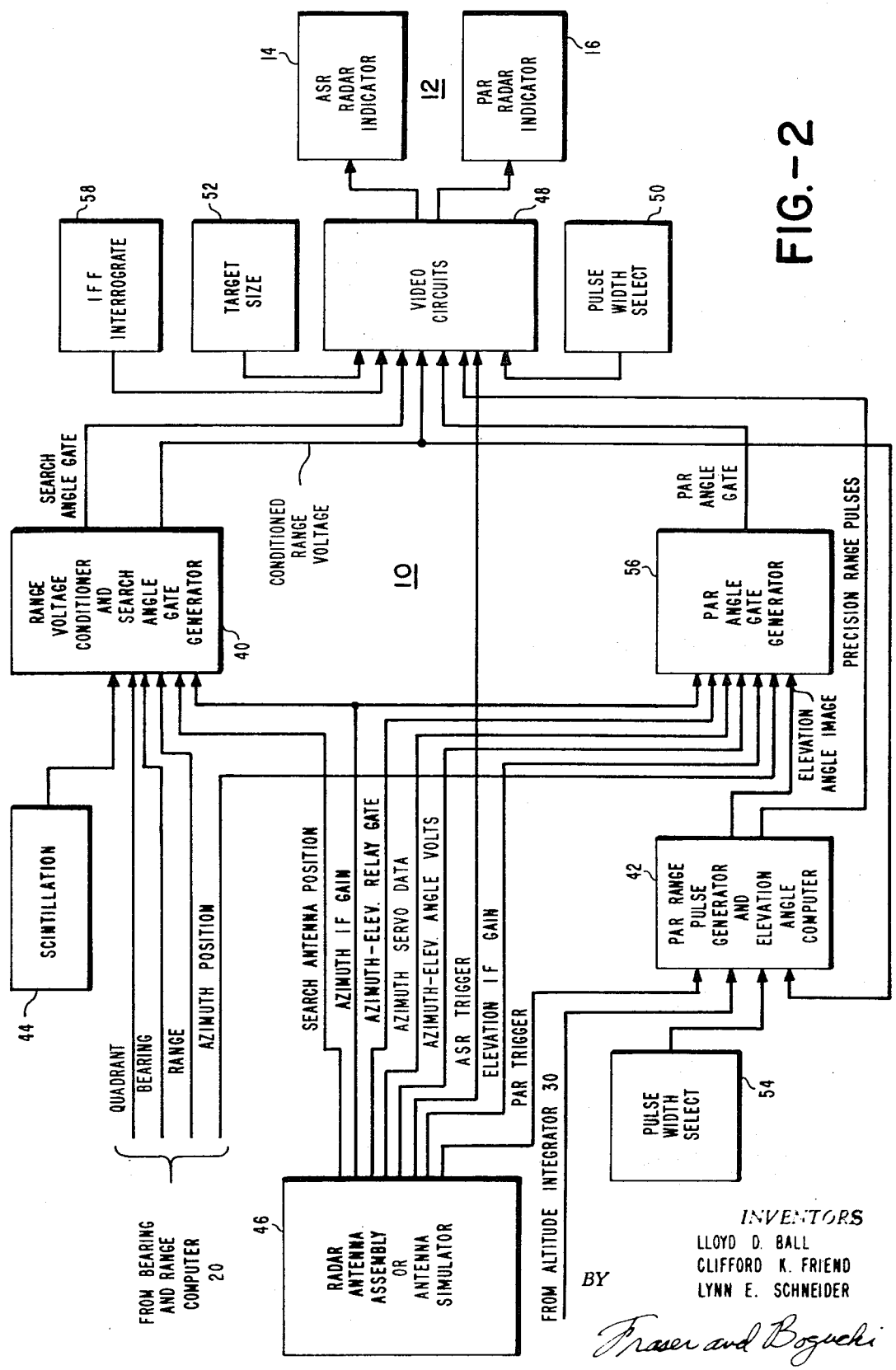

INVENTORS
LLOYD D. BALL
CLIFFORD K. FRIEND
LYNN E. SCHNEIDER
BY
Fraser and Bogucki

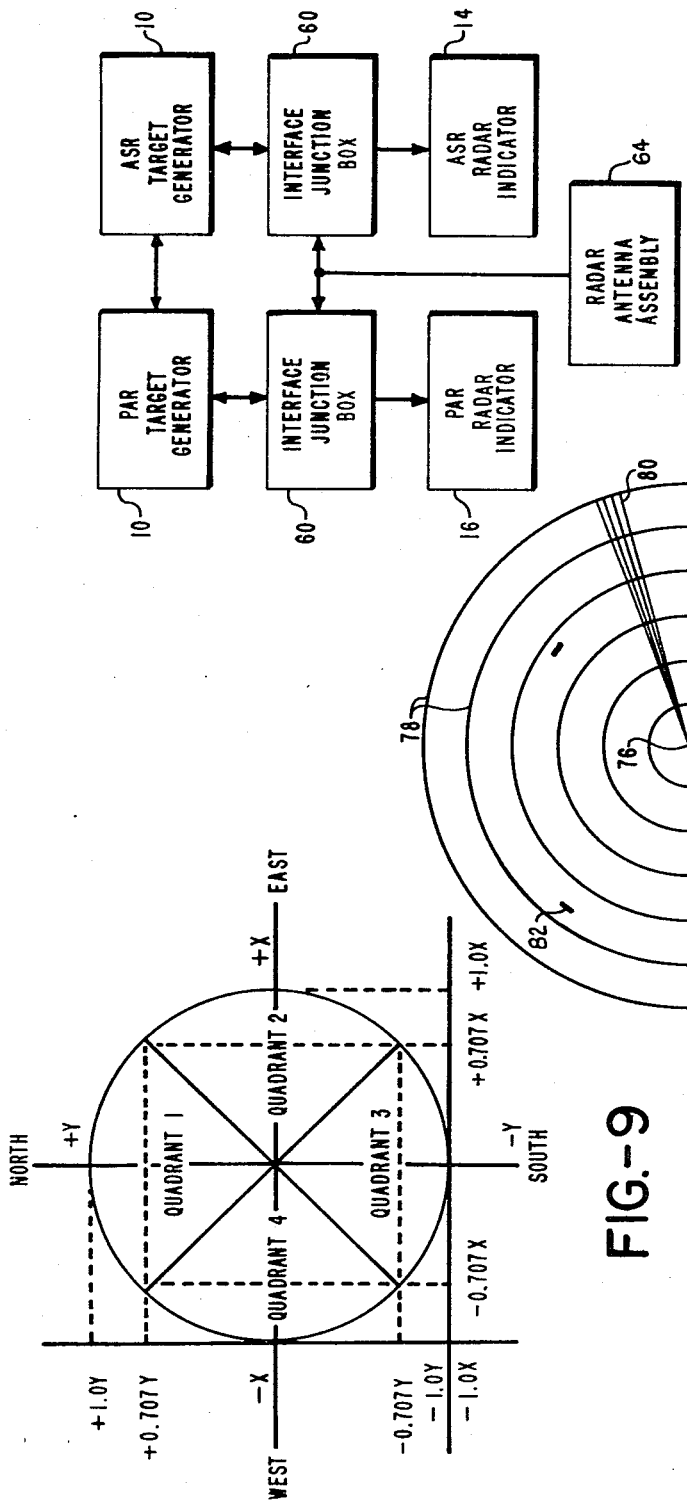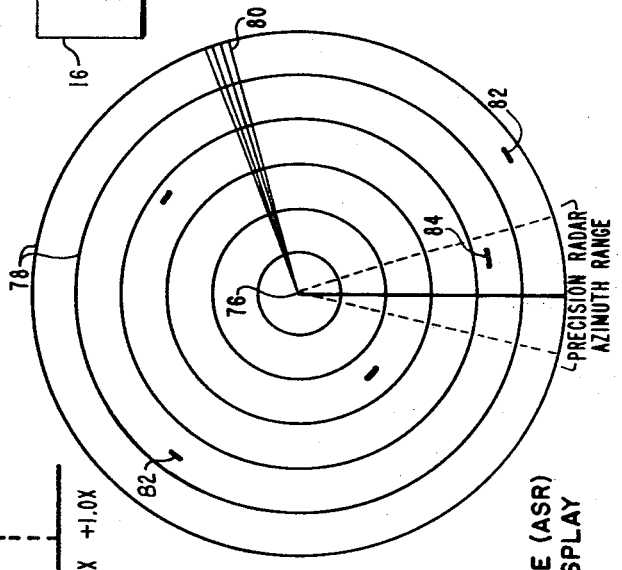

FIG.-14, FIG.-16, FIG.-7

INVENTORS
LLOYD D BALL
CLIFFORD K. FRIEND
LYNN E. SCHNEIDER
BY
Fraser and Bogucki

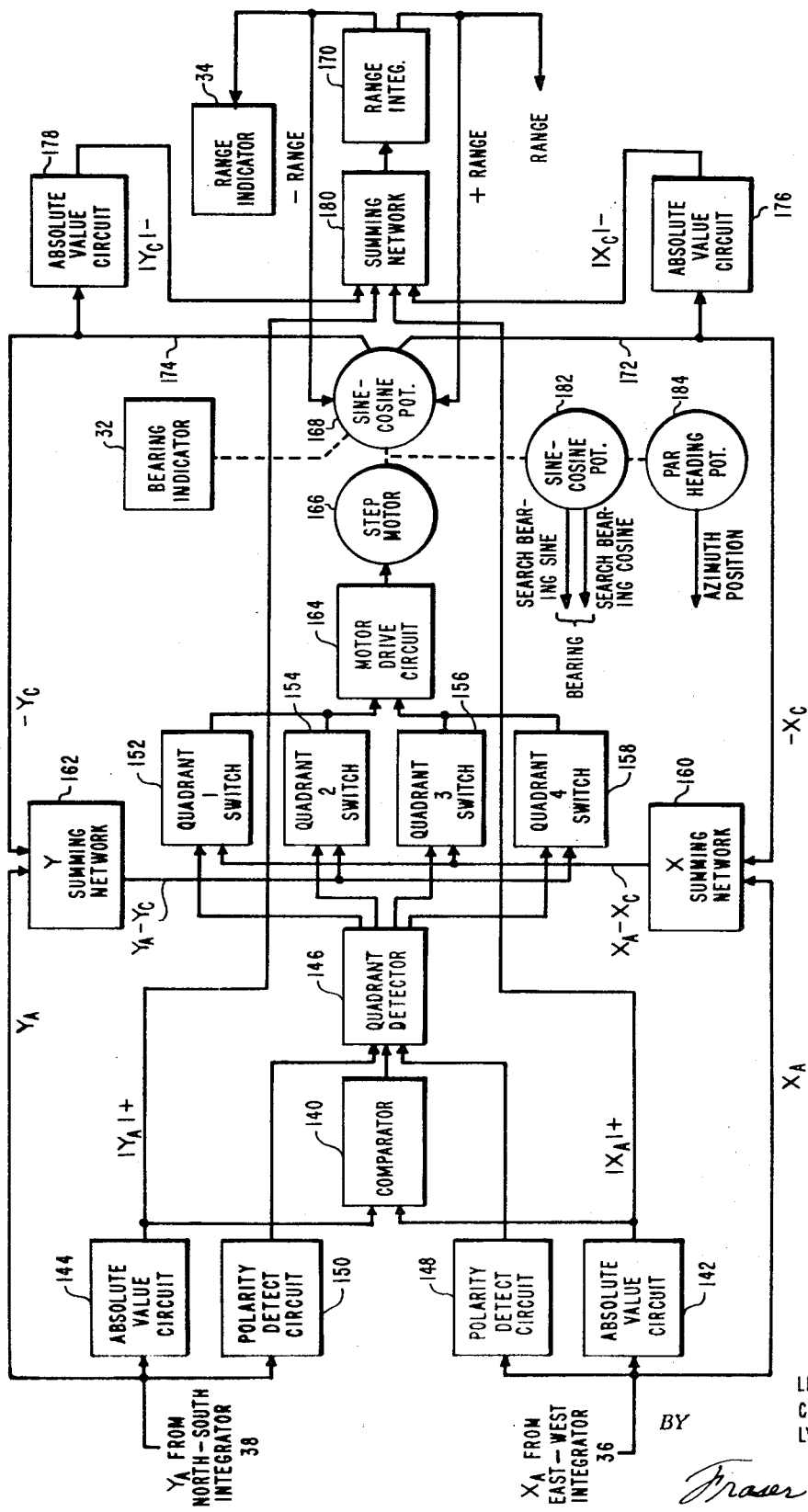
FIG.-8 BEARING AND RANGE COMPUTER 20

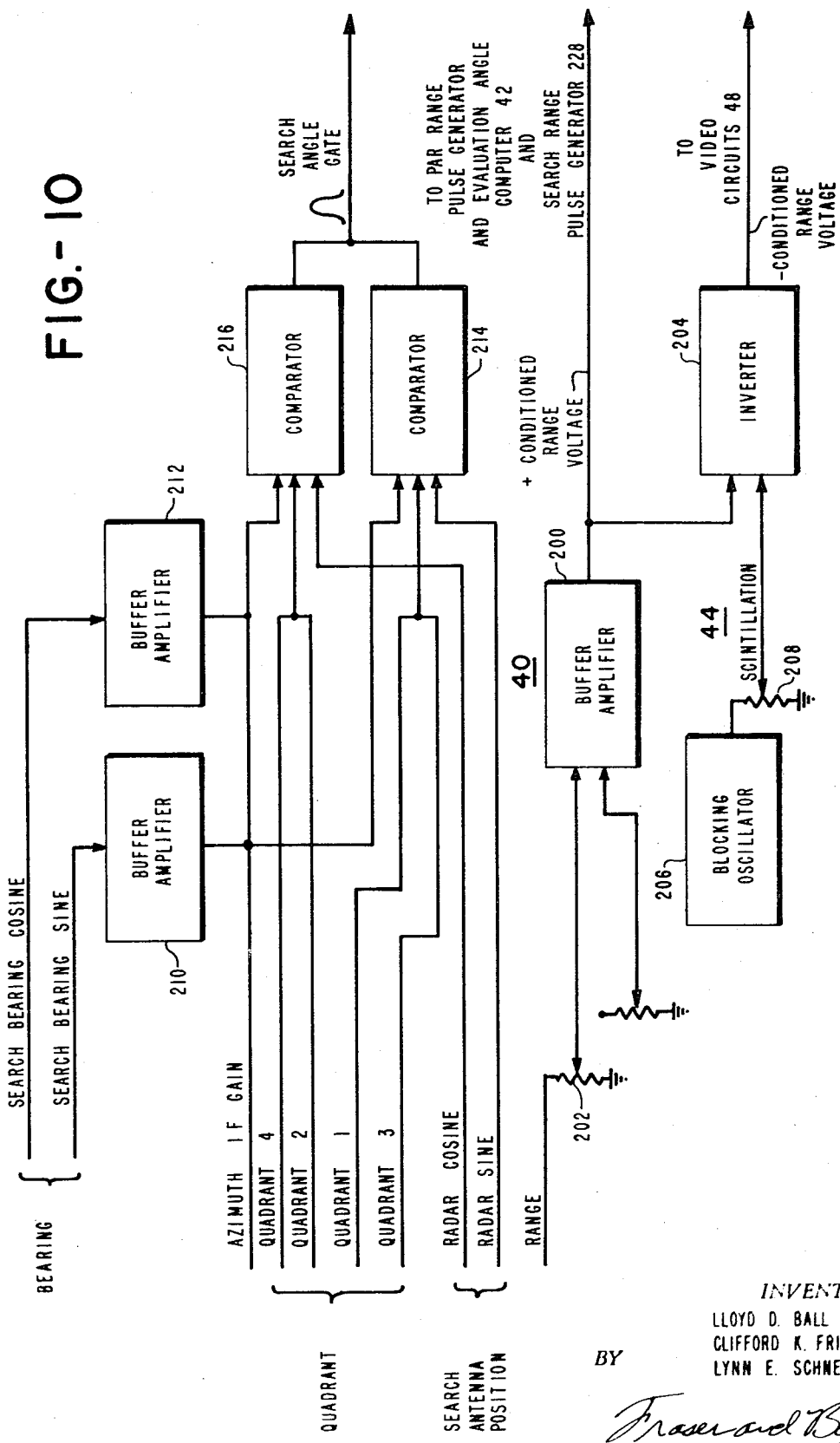

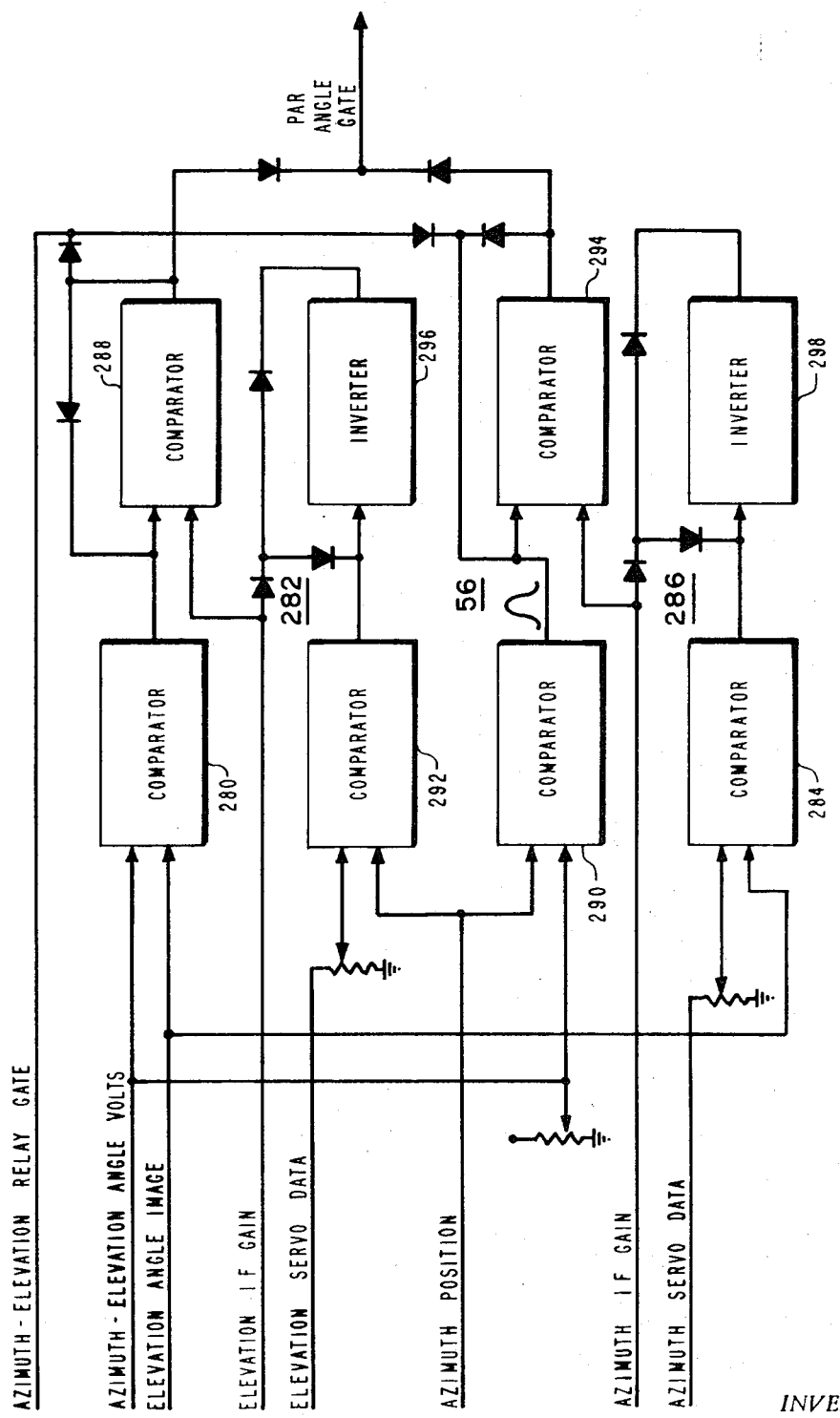

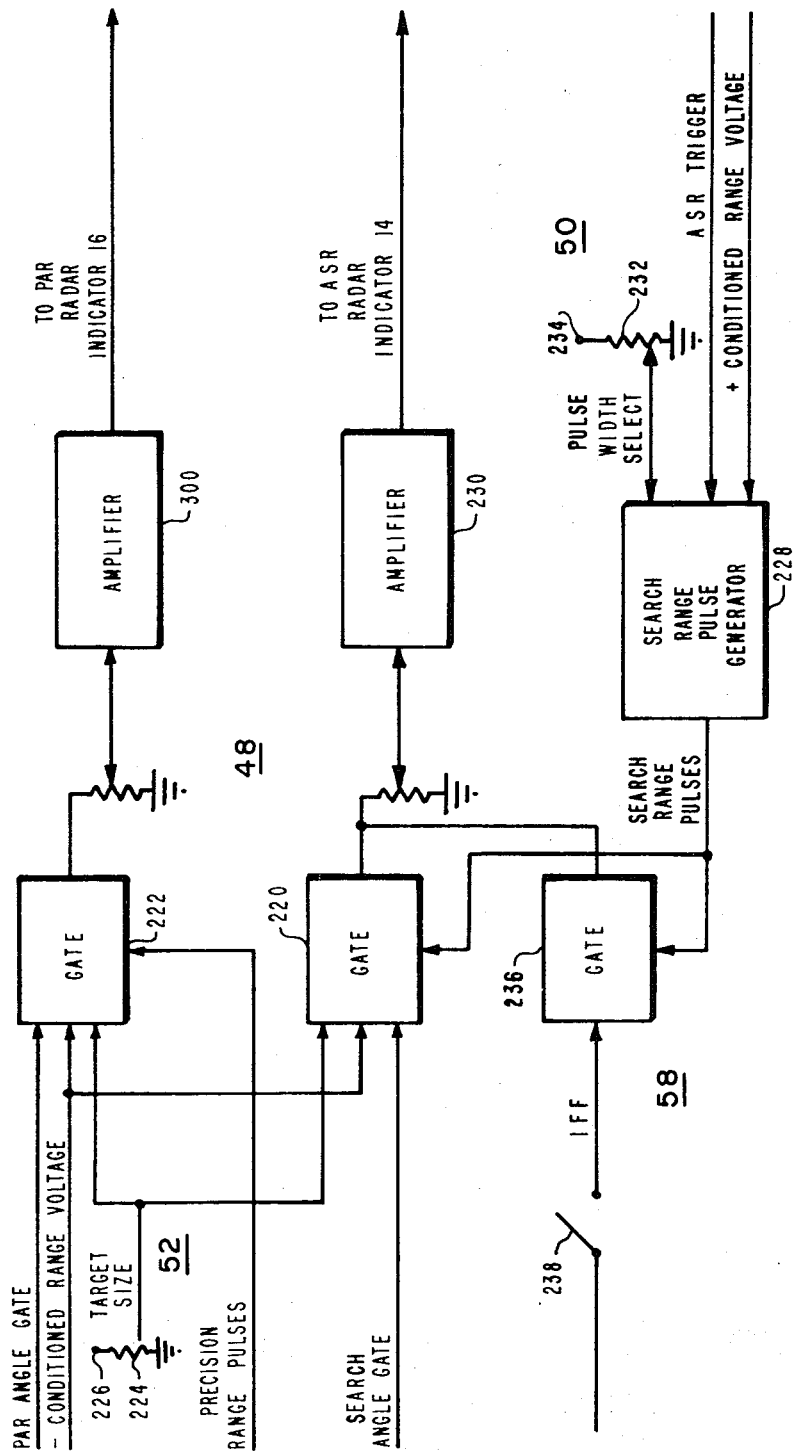

TARGET GENERATOR

BACKGROUND OF THE INVENTION

1. Field of the Invention

The present invention relates to target generators, and more particularly to target generators of the type which provide a radar display from continuously varying azimuth and elevation signals simulating an approaching or landing aircraft for radar training exercises.

2. History of the Prior Art

In the training of operators of airport surveillance and ground control approach radar systems it has been found advantageous to employ target generators for simulating aircraft operations, particularly the landing of aircraft. Radar operators can be more quickly trained in controller-to-aircraft communications and operator proficiency can be more rapidly improved under emergency air traffic conditions with training exercises using the simulated target signals provided by such target generators. The expense, inconvenience and hazard of using the aircraft itself are thereby completely eliminated.

During normal operations actual aircraft are located by a radar antenna assembly and radar system which provide a changing display representing the azimuth and elevation of the aircraft. Such display, in one type of radar, assumes the form of small illuminated targets on one or more indicator scopes having reference markings which establish a desired course for approaching aircraft. In this way the radar operator is able to maintain constant surveillance of one or more aircraft while communicating with the aircraft through their approach and ultimate landing. The operator is required to command the approach by communicating appropriate instructions such as changes in rate of descent, heading and air speed so that position, altitude and speed are correct for landing when the aircraft is over the runway.

During training exercises one or more target generators replace the radar antenna assembly and simulate approaching aircraft by providing the azimuth and elevation signals directly to the radar display system. Such target generators are typically provided with a set of indicators, such as bearing, range and heading indicators, and a set of controls, such as air speed, vertical speed and turn rate controls. The instructor establishes initial conditions and the operator observes the radar display, communicating air speed, rate of turn, heading and rate of descent commands to attempt to maintain the simulated target on its proper landing path and at proper air speed.

In one typical prior art target generator azimuth and elevation signals at the output are provided in response to initial settings of bearing, range, heading, air speed, vertical speed and turn rate. Resulting signals representing turn rate, air speed and direction are applied to a heading computer for computation of the heading sine or X component of velocity and the heading cosine or Y component of velocity. The resulting sine and cosine signals are individually integrated to provide to a bearing and range computer, signals representing the X and Y positions of the aircraft. The bearing and range computer responds to the position signals to compute the bearing and range of the aircraft and to provide numerical readout if desired. Aircraft altitude is represented by a Z position signal, generated by constant integration of the vertical speed setting signal. The Z position or altitude signal is converted to again provide a numerical readout if desired. The X, Y and Z position signals along with a signal representing the computed range are applied to an azimuth and elevation computer resulting in the generation of signals representing the azimuth and elevation of the simulated aircraft target, these values being represented on the radar scope display.

The heading computer in prior art target generators of this type typically comprises a servo motor with tachometer feedback, which motor turns in response to and at a rate determined by the manually adjustable turn rate signal to position an associated potentiometer. The potentiometer converts the manually set air speed signal into a pair of signals representing the heading sine or X component of velocity and the heading cosine or Y component of velocity. The sine and cosine signals are individually integrated to provide X and Y position signals to the bearing and range computer. The bearing and range computer typically comprises a servo motor and associated X and Y bearing potentiometers which respectively respond to the X and Y position signals to provide signals which when summed produce a range signal. The X and Y potentiometers are also typically coupled through a chopper and servo amplifier to provide feedback to the servo motor.

Heading and range and bearing computers of the type described suffer from a number of inherent disadvantages. For one thing such arrangements are typically very expensive due to their complexity and the cost of the components involved. An important operative disadvantage arises from the fact that an exercise cannot be interrupted or held static for analysis and critique. Such arrangements, moreover, are severely limited in the range of speeds available, are prone to sticking, and do not provide very realistic simulation of turn rates and the like due to the type of feedback employed as well as other factors.

In an effort to eliminate some of the problems noted above, target generators have been developed which rely primarily on digital principles of operation. However, aside from being very large, bulky and expensive units, target generators of this type generally provide highly unrealistic simulated targets which are easily distinguished from those of an actual aircraft. Moreover, features such as a wind drift factor, target amplitude scintillation, IF gain controls, IFF interrogation, variation of target size as a function of range, and antenna and PRF simulation are normally not available in such systems.

Actual aircraft result in the generation of target signals which may be simultaneously and independently displayed on both long range (ASR) and short range (PAR) radar indicators where desired. Prior art target generators, however, are normally designed to provide either an ASR display or a PAR display, but not both simultaneously. Such target generators, moreover, are normally designed for use with a particular type of radar system and are not readily adaptable for use with other radar types. Other capabilities such as tape replay of a given target course or slaving of plural target generators with the selective handover of the target generating function therebetween are also not provided.

BRIEF DESCRIPTION OF THE INVENTION

Target generators according to the present invention compute heading and bearing and range employing incrementally varying drive units in computing systems that thus have a memory feature. Such drive units are highly stable, generally free from alignment, are highly reliable and permit interrupt of a training exercise. The target generator may be interfaced with a radar antenna assembly to provide both simulated and actual aircraft target signals to a radar indicator where desired. Interfacing is accomplished by a junction box independent of the target generator itself and which may be replaced with other junction boxes as necessary to provide considerable flexibility in the use of the target generator with a wide variety of different radar systems. Where it is desired to use simulated aircraft target signals for both long range and precision radar, the target generator enables the generation of signals for both long range and precision radar displays simultaneously and independently using PAR antenna servo controls as well as the ASR antenna information. Alternatively, two different target generators may be interconnected so that a first one of the generators provides target signals for long range radar operation with the second target generator being slaved to the first. Upon handover the second target generator changes from the slaving mode to the normal mode of operation to generate the simulated target signals for close range or precision radar operations.

The target itself as provided by target generators according to the invention is very realistic due to the availability of features such as simulation of wind conditions, scintillation of target amplitude, IF gain controls, inverse variation in target size with range, and IFF interrogation.

One preferred arrangement of a target generator according to the invention employs a heading computer comprising a step motor coupled to drive a potentiometer in response to turn rate and direction signals applied to a logical drive circuit for the motor. The drive circuit responds to the direction signal by determining in which direction the step motor is to be driven. The drive circuit also responds to the turn rate signal to drive the step motor at a rate approximating the turn rate of the aircraft being simulated. A sine-cosine potentiometer responsive to the step motor provides sine and cosine signals representative of the instantaneous heading.

The heading sine and cosine signals are respectively applied to an east-west integrator and a north-south integrator to provide X and Y position signals. A selected voltage is coupled through an appropriately set potentiometer to provide wind factor signals to the integrators where desired.

The preferred target generator arrangement also includes a bearing and range computer having circuitry for comparing the absolute values of the X and Y position signals to determine in which of four different quadrants the bearing lies. A step motor is driven so as to position an associated potentiometer in response to the difference between an input or actual position signal and a position signal as computed by the potentiometer, the difference between the actual and computed values of the X position being used for two of the quadrants and the difference between the actual and computed values of the Y position being used for the other two quadrants. The driving of the step motor in accordance with the difference between an actual and computed position signal, X or Y, provides feedback for the computed aircraft bearing. Range feedback is provided by a portion of such arrangement which sums the actual position signals X and Y with the computed X and Y position signals provided by the potentiometer, and by integrating the resulting output of such summing operation and applying the results of integration as the input to the potentiometer.

The computed bearing and range signals are applied to a range voltage conditioner and search angle gate generator together with signals including synchro data from a radar antenna assembly or radar antenna simulator, the synchro data being converted into sine and cosine equivalents. The computed range signal is buffered and amplified to produce the conditioned range voltage and is inverted to produce a negative conditioned range voltage. Since the computed signal varies directly with range, the resulting negative conditioned range voltage varies inversely with range so as to produce a decrease in target size with increasing range when applied to video circuits. Scintillation of the ultimately produced long range or ASR radar target is achieved by circuitry including a non-synchronous or blocking oscillator which generates a randomly varying signal. The randomly varying signal is applied to vary the conditioned range voltage and ultimately the target intensity as the radar indicators continue to sweep the resulting targets. The search angle gate is provided by circuitry which compares bearing sine and cosine as provided by a potentiometer within the bearing and range computer with the sine and cosine values derived from the radar antenna assembly synchro data. The azimuth IF gain from the radar antenna assembly is applied to vary the width of the ultimately produced ASR target by adjusting the width of the search angle gate.

The negative conditioned range voltage and the search angle gate are applied to the inputs of gating circuitry within video circuits, the gating circuitry periodically passing selected ones of sequentially generated search range pulses to a long range or ASR radar indicator as the simulated target under the control of the search angle gate. A target size potentiometer provides a third input to the gating circuitry and combines with the range voltage and search angle gate inputs to determine the size and intensity of the resulting simulated target. The search range pulses are provided by a search range pulse generator which generates pulses of selected width in response to the conditioned range voltage and ASR trigger information from the radar antenna assembly.

PAR antenna servo controls are employed to provide a simulated target to a precision or PAR radar indicator simultaneously with and independently of the ASR radar display. In this connection the conditioned range voltage is applied to a PAR range pulse generator and elevation angle computer together with computed aircraft altitude, PAR trigger information from the radar antenna assembly and a potentiometer signal determining the desired width of precision range pulses generated thereby. The PAR range pulse generator part of the computer is similar to the search range pulse generator. The PAR trigger information produced by the antenna PRF starts a ramp generator and the resulting ramp signal is compared with the conditioned range voltage so as to produce a precision range pulse when equal. A multivibrator responds to each precision range pulse and to the PAR trigger information to control the operation of an integrator coupled to receive the computed altitude so as to provide an elevation angle image in the form of a DC voltage representing altitude as a function of range.

The elevation angle image is applied to a PAR angle gate generator together with an azimuth position signal from the bearing and range computer and a plurality of signals from the radar antenna assembly including an azimuth-elevation relay gate, azimuth-elevation angle volts, azimuth servo data, azimuth IF gain and elevation IF gain. The PAR angle gate generator includes elevation circuitry and azimuth circuitry which operate alternately under the control of the azimuth-elevation relay gate and which combine to provide a PAR signal angle gate. The elevation circuitry includes a first comparator for comparing the elevation angle image with the azimuth-elevation angle volts, a second comparator for comparing the azimuth position with the elevation servo data and associated inverter for inverting the resulting signal, and a third comparator for comparing the outputs of the first comparator and the inverter to provide the PAR angle gate during the elevation portion of the relay gate. The elevation IF gain is coupled to the inverter output to vary the width of the resulting PAR angle gate in desired fashion. The azimuth circuitry includes a first comparator for comparing the azimuth position with the azimuth-elevation angle volts, a second comparator for comparing the elevation angle image with the azimuth servo data and associated inverter for inverting the resulting signal, and a third comparator for comparing the outputs of the first comparator and the inverter to provide the PAR angle gate during the azimuth portion of the relay gate. The azimuth IF gain is coupled to the output of the inverter to vary the width of the resulting PAR angle gate in desired fashion.

The PAR angle gate is applied as an input to gating circuitry within the video circuits together with the conditioned range voltage and an input from the target size potentiometer determining the size and intensity of the resulting simulated precision or PAR target. The gating circuitry passes the precision range pulses from the range pulse generator and elevation angle computer to a PAR radar indicator as the simulated target under the control of the PAR angle gate.

Where desired a tape recording of a desired flight course may be made by simultaneously recording the X and Y position signals at the outputs of the east-west and north-south integrators and the computed aircraft altitude as a Z position signal as the target generator is operated so as to cause the simulated targets to follow the desired flight course. Thereafter the recorded X, Y and Z position signals are read from the tape and introduced at the appropriate places within the target generator to reproduce the desired flight course. The tape recording is useful in demonstrating a correct flight course for a given set of conditions, and may also be used in a multi-target generator setup to realistically simulate air traffic conditions by simultaneously generating a plurality of simulated aircraft targets.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIGS. 1 and 2, taken together, are a block diagram of a preferred form of target generator according to the invention;

FIG. 4 is an illustration of a typical long range or ASR radar indicator display;

FIG. 7 is a schematic diagram of one preferred circuit for providing a wind factor in the target generator of FIGS. 1 and 2;

FIG. 8 is a block diagram of one preferred arrangement of a bearing and range computer for use in the target generator of FIGS. 1 and 2;

FIG. 9 is an illustration useful in explaining the manner of operation of the arrangement of FIG. 8;

FIG. 10 is a block diagram of one preferred arrangement of a range voltage conditioner and search angle gate generator and scintillation circuit for use in the target generator of FIGS. 1 and 2;

FIG. 12 is a block diagram of one preferred arrangement of a PAR angle gate generator for use in the target generator of FIGS. 1 and 2;

FIG. 13 is a block diagram of one preferred arrangement of video circuits, a pulse width select circuit, a target size circuit and an IFF interrogate circuit for use in the target generator of FIGS. 1 and 2;

FIG. 14 is a block diagram illustrating the manner in which the target generator of FIGS. 1 and 2 provides simulated aircraft targets to both ASR and PAR radar indicators simultaneously and independently;

FIG. 15 is a block diagram illustrating the manner in which two of the target generators of FIGS. 1 and 2 may be interconnected to provide handover between long and short range radar operations; and FIG. 16 is a block diagram illustrating a tape replay feature according to the invention.

DETAILED DESCRIPTION

Figure 1:
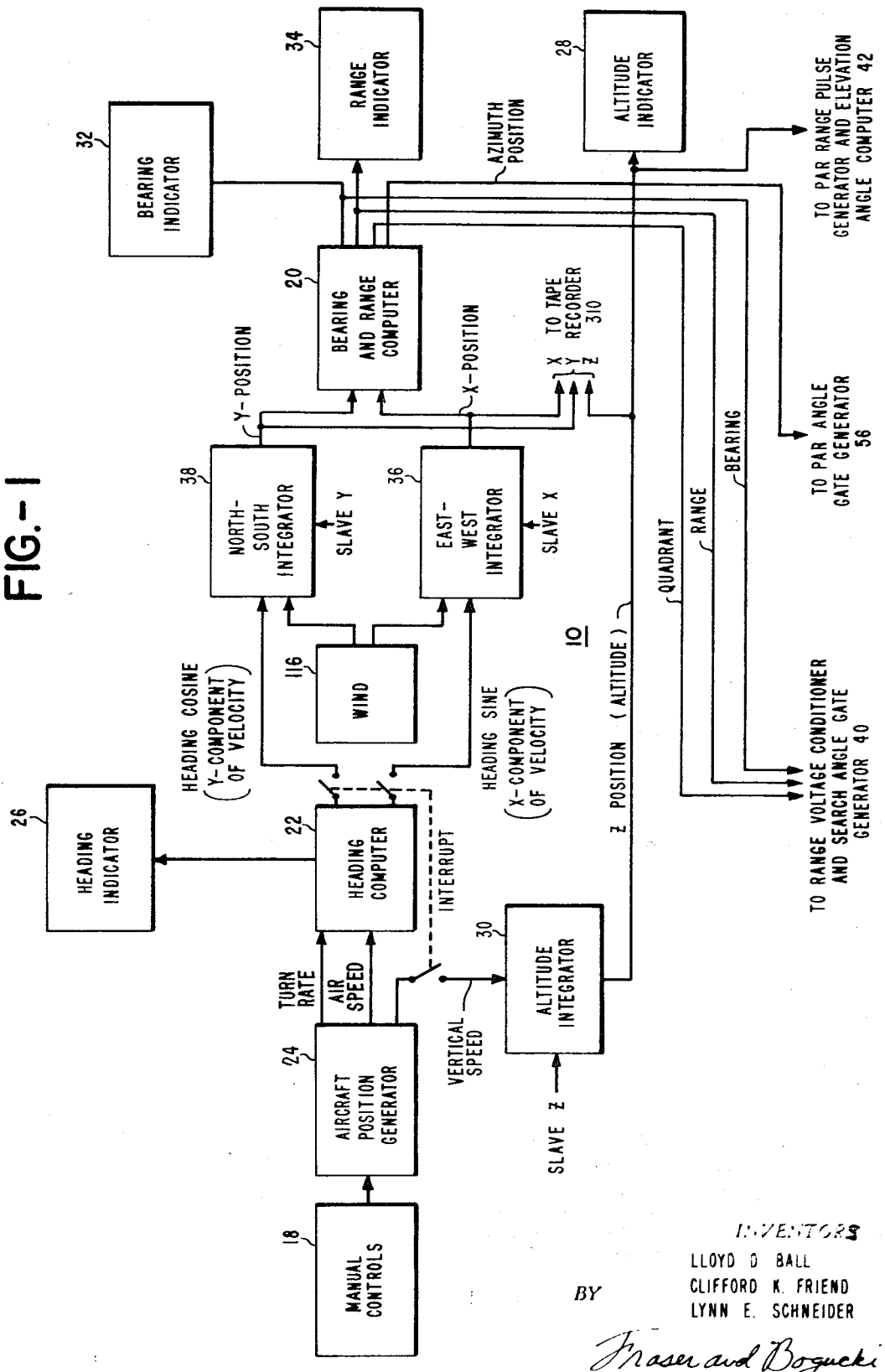

One preferred arrangement of a target generator according to the invention is illustrated in block diagram form in FIGS. 1 and 2. The target generator 10 of FIGS. 1 and 2 is normally operated manually by an instructor in response to commands given by an operator or trainee, and provides simulated aircraft targets in the form of changing azimuth and elevation values on a radar indicator 12 (FIG. 2) including a long range or ASR radar indicator 14 and a short range, precision or PAR radar indicator 16. Each of the indicators 14 and 16 typically comprises a video screen and circuitry for responding to input azimuth and elevation signals, and provides corresponding illuminated targets on the screen. Numerical readouts may also be provided, but the indicator 12 may be conventional radar displays, useful with actual radar return signals, and does not form a part of the target generator as such.

During a typical training exercise the student to be trained sits at the radar indicator 12 while the instructor positions himself at the target generator 10 which is enclosed within a container or cabinet of light weight and compact size separated from the radar indicator 12. During the training operation, the operator-trainee and the instructor communicate with one another by direct voice, audio equipment or other appropriate media. The instructor begins the exercise by entering initial conditions in the target generator using appropriate external manual controls 18. The initial conditions include bearing and range which are set at the output of a bearing and range computer 20, heading which is set at the output of a heading computer 22, and air speed, vertical speed and turn rate which are set into an aircraft position generator 24. Certain adjustments may also be made including adjustment of the target size and the setting of wind speed and direction where wind is to be a factor in the exercise. A heading indicator 26 coupled to the heading computer 22 is checked by the instructor to determine that the proper heading has been set into the heading computer 22. Similarly an altitude indicator 28 coupled to the aircraft position generator 24 through an altitude integrator 30 is checked to verify the desired altitude setting, and bearing and range indicators 32 and 34 at the output of the bearing and range computer 20 are checked to verify the proper setting of bearing and range.

As the operation of the target generator 10 begins, the aircraft position generator 24 provides turn rate and air speed signals to the heading computer 22. The computer 22 responds by continuously computing the heading and causing it to be displayed by the indicator 26. When the turn rate is zero, the heading remains constant, and when the turn rate assumes some value other than zero, the heading continuously changes as determined by the value of the turn rate. The heading may be represented in terms of a convenient reference scale such as an X, Y coordinate system or display with +Y and −Y respectively representing north and south and +X and −X respectively representing east and west. The heading computer 22 determines the sine and cosine of the heading angle, then multiplies the air speed signal by the sine and cosine to provide a signal representing the X component of the aircraft's velocity to an east-west integrator 36 and a signal representing the Y component of velocity to a north-south integrator 38. The integrators 36 and 38 integrate the signals at their respective inputs to provide to the bearing and range computer 20 output signals respectively representing the X and Y positions of the aircraft. The altitude integrator 30 integrates a vertical speed signal at the output of the aircraft position generator 24 to provide a signal representing Z position or altitude of the simulated aircraft.

As hereafter described in detail, the bearing and range computer 20 computes bearing and range by first comparing the absolute values of the X and Y position signals to determine in which of four different quadrants of the X, Y coordinate system the bearing lies. The computer 20 includes a step motor coupled to drive a plurality of potentiometers, one of which in turn responds to a range signal to provide computed values of the aircraft X and Y positions in the form of signals. The initial bearing quadrant determination determines whether the step motor is to be driven in response to the difference between the signals representing actual and computed X position or the difference between the signals representing actual and computed Y position, the X position signals being employed for two of the quadrants and the Y position signals being employed for the other two quadrants. The actual and computed X and Y position signals are also summed at the input of an integrator, the integrator output providing the range signal to the potentiometer as well as to the range indicator 34. The bearing indicator 32 is coupled directly to the potentiometer. The range signal at the output of the computer 20 is coupled to the range indicator 34, and to a range voltage conditioner and search angle gate generator 40 (FIG. 2). The bearing signal at the output of the computer 20 is applied to the bearing indicator 32 and to the range voltage conditioner and search angle gate generator 40 together with a signal representing the quadrant of the heading. The altitude signal at the output of the altitude integrator 30 is applied to the altitude indicator 28 and to a PAR range pulse generator and elevation angle computer 42 (FIG. 2).

As shown in FIG. 2 the range voltage conditioner and search angle gate generator 40 receives quadrant, bearing and range input signals from the bearing and range computer 20 (FIG. 1), a signal from an associated scintillation circuit 44, and signals representing the search antenna position and the azimuth IF gain from a radar antenna assembly or antenna simulator, conveniently designated 46 in FIG. 2. In accordance with the invention the synchro data from the antenna assembly or simulator 46 is converted into sine and cosine equivalents to provide the search antenna position signal and is thereafter compared with the sine and cosine of the computed bearing to produce a search angle gate which results in highly realistic targets, as hereafter described in greater detail.

The range voltage conditioner and search angle gate generator 40 conditions the range signal from the bearing and range computer 20 by amplification and inversion to provide positive and negative conditioned range voltages. The negative conditioned range voltage which is amplitude modulated by the scintillation circuit 44 is coupled to video circuits 48 to randomly vary the intensity of the resulting ASR target to simulate target amplitude scintillation and to vary the size of the ASR target inversely with range. The positive conditioned range voltage is applied to a search range pulse generator within the video circuits 48 and to the PAR range pulse generator and elevation angle computer 42.

In the absence of the search angle gate generator within the circuit 40 the computed bearing and range signals would result in a continuous line on the radar indicator 14 rather than a distinct target. Therefore the bearing and range information must be gated in accordance with the antenna scanning or PRF, and this function is performed by the search angle gate generated by the search angle gate generator. The search angle gate generator compares the sine and cosine derived from the synchro data of the antenna assembly or simulator 46 with the sine and cosine of computed bearing to provide the search angle gate. The azimuth IF gain is applied to control the width of the search angle gate to thereby control the width of the resulting ASR target in desired fashion.

The video circuits 48 include a search range pulse generator responsive to the positive conditioned range voltage from the range voltage conditioner and search angle gate generator 40, to an ASR trigger signal from the antenna assembly or simulator 46, and to a pulse width select circuit 50 to generate search range pulses in timed relation with the ASR trigger signals. The pulse width select circuit 50 may be used to adjust the width of the search range pulses as desired. Selected portions of the successively generated search range pulses are then gated to the ASR radar indicator 14 under the control of the search angle gate as adjusted by the negative conditioned range voltage and by a target size circuit 52.

The PAR range pulse generator and elevation angle computer 42 receives the positive conditioned range voltage from the range voltage conditioner and search angle gate generator 40, the altitude signal from the altitude integrator 30 (FIG. 1), a PAR trigger from the radar antenna assembly or antenna simulator 46, and a signal from a pulse width select circuit 54. The range pulse generating portion of the computer 42 functions in the same manner as the search range pulse generator within the video circuits 48 by generating precision range pulses in timed relation with the PAR trigger information and having a width controlled by the pulse width select circuit 54. In addition, however, an elevation angle image in the form of a signal representing the altitude in terms of range must be determined and this is done by the elevation angle computer portion of the circuit 42 simultaneously with the generation of the precision range pulses.

As in the case of the ASR target, the bearing and range information would result in continuous lines on the PAR radar indicator 16 in the absence of angle gating according to the antenna PRF as provided by the PAR angle gate generator 56. The PAR angle gate generator 56 receives in addition to the elevation angle image from the PAR range pulse generator and elevation angle computer 42 and the azimuth position from the bearing and range computer 20 information from the antenna assembly or simulator 46 including signals representing the azimuth-elevation relay gate, azimuth-elevation angle volts, the azimuth servo data, the azimuth IF gain and the elevation IF gain. The PAR angle gate generator 56 responds to the various input signals to provide to the video circuits 48 a PAR angle gate signal for purposes of gating the precision range pulses within the video circuits 48. The video circuits 48 gate selected groups of the successively generated precision range pulses from the PAR range pulse generator and elevation angle computer 42 to the PAR radar indicator 16 as the simulated precision or PAR target under the control of the PAR angle gate as adjusted by the negative conditioned range voltage and by the target size circuit 52. Where desired an IFF interrogate circuit 58 is employed to increase the width of the ASR target to a maximum value to simulate response from an interrogated transponder.

It will be appreciated that the various signals within the target generator 10 are typically constantly changing in response to movement of the simulated aircraft so as to result in azimuth and elevation signals which are constantly changing. As previously mentioned, turn rates other than zero will result in a normally gradual but constant change in the aircraft heading. Such changes result in changes in the X and Y position signals, and ultimately changes in the bearing and range. Where the turn rate is zero and the air speed is fixed, the inputs to the integrators 36 and 38 remain constant. However, the X and Y position signals continue to change in relation to the air speed resulting in a constantly changing range signal. The Z position signal provided by the altitude integrator 30 is constantly changing so long as the vertical speed of the aircraft is not zero. The net result is illuminated targets on the radar indicator 12 which constantly move relative to graduated scales thereon as described hereafter.

At various times during the training exercise, the operator-trainee sitting at the radar indicator 12 issues commands to the instructor at the target generator based on his observation of the visual displays on the indicators 14 and 16. Such commands typically take the form of specified changes in the turn rate, vertical speed and air speed, which changes are made by appropriate manipulation of the manual controls 18 by the instructor. The operation typically continues until the simulated aircraft has been brought through its approach and touches down for the landing. As described hereafter the radar indicator 12 is normally coupled to a plurality of the target generators 10 so as to be able to simulate the typical condition in which more than one aircraft is approaching the airport for landing.

Figure 3:
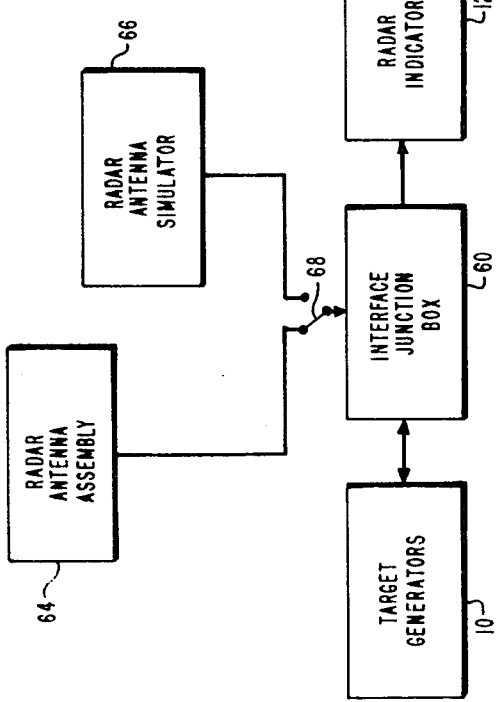
FIG. 3 is a block diagram illustrating the manner in which the target generator of FIGS. 1 and 2 may be interfaced with different radar systems.

According to the invention and as shown in FIG. 3, a plurality of the target generators 10, typically three in number, are coupled to the radar indicator 12 through an interface junction box 60 to provide flexibility in the use of the target generators with different types of radar systems. The generators 10 and the junction box 60 comprise additions to a normal radar setup in which the radar antenna assembly 64 is otherwise directly coupled to the radar indicator 12. The radar antenna assembly 64 provides to the radar indicator 12 azimuth and elevation signals corresponding to actual aircraft. The addition of the target generators 10 and the interface junction box 60 enables actual and simulated aircraft targets to be simultaneously displayed on the radar indicator 12 when desired. During normal operation of the radar system and when a training exercise is not being conducted, the antenna assembly 64 provides actual aircraft signals to the radar indicator 12. During a training exercise, one or more of the target generators 10 may be used to provide simulated aircraft target signals to the radar indicator 12 to the exclusion of signals from the radar antenna assembly 64. Alternatively, actual and simulated target signals may be simultaneously provided to the radar indicator 12 as mentioned above. The interface junction box 60 which is eliminated from FIGS. 1 and 2 for simplicity comprises the necessary circuitry for adapting the target generator 10 for use with different types of radar systems and includes circuitry for converting the antenna synchro data into its sine and cosine equivalents for subsequent generation of the search angle gate.

To simplify the arrangement for training purposes or where an actual radar antenna assembly is not available, a radar antenna simulator 66 may be used to provide the search antenna position and other data to the target generator 10. The simulator 66 may comprise any appropriate conventional arrangement for providing the various antenna information discussed in connection with FIG. 2. A selection switch 68 may be used to alternately couple the radar antenna assembly 64 or the radar antenna simulator 66 to the interface junction box 60 where desired.

Where radar systems having different characteristics are to be used with the target generator 10, it is only necessary to replace the interface junction box 60 with a different appropriate junction box to adapt the target generator 10 to the particular radar system to be used.

FIG. 4 illustrates a typical long range, search, or ASR radar display as provided by the ASR radar indicator 14 shown in FIG. 2. The ASR radar display includes a central point 76 representing the location of the radar system or the airport and a series of concentric circles 78 representing increasing distance or range from the central point 76 in all directions. A direction finding strobe 80 emanates from the central point 76 and sweeps about the display to periodically illuminate various targets 82 representing aircraft within the range of the radar system.

During a training exercise the operator-trainee observes the display of FIG. 4 and issues appropriate instruc-tions so as to enable the various aircraft to assume proper courses. However, whereas the ASR radar indicator scans in all directions for a total of 360°, the precision or PAR indicator display shown in FIG. 5 and described hereafter encompasses but a small portion of this. The typical coverage of a PAR indicator display in terms of the azimuth range is illustrated in FIG. 4. As seen in FIG. 4 the target 84 may represent an aircraft which is ultimately to land at the airport but is still beyond the range of the PAR radar indicator 16. In such a case the target 84 moves along the section defined by the azimuth range of the PAR radar display toward the airport as represented by the central point 76 until it comes within the range of the PAR radar display, at which time simulated targets representing the aircraft are simultaneously displayed on both the ASR and PAR radar indicators 14 and 16. In some radar systems the PAR radar indicator 16 encompasses the same range as does the ASR radar indicator 14, in which event displays on both indicators are simultaneously provided during the entire approach.

Figure 5:
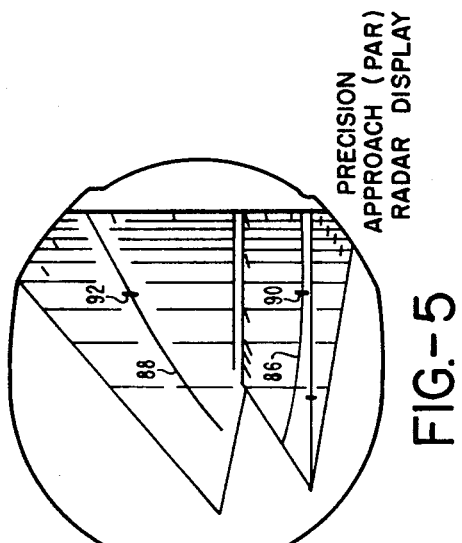
FIG. 5 is an illustration of a typical precision approach or PAR radar indicator display.

FIG. 5 illustrates a typical precision approach or PAR radar display as provided by the PAR radar indicator 16 of FIG. 2. The indicator display includes an electronic runway course line 86 and an electronic glidepath cursor 88. The PAR radar indicator 16 responds to input azimuth information to generate a visible target on the scale including the runway course line 86, the location of the target above or below the course line 86 representing deviation of the aircraft azimuth from the desired azimuth as represented by the course line 86. Thus a target 90 located on the course line 86 as seen in FIG. 5 indicates that the aircraft azimuth is correct. On the other hand, targets above or below the course line 86 suggest to the operator that he issue appropriate commands directly to the pilot in the case of actual aircraft or to the instructor in the case of a simulated training exercise so that appropriate changes will be made to put the aircraft on the course line 86. As the aircraft approaches the airport, the target 90 moves from right to left as seen in FIG. 5 until final touchdown when the target is at the left extreme of the scale.

The PAR radar indicator 16 converts input elevation information into a visible target as projected on the scale encompassing the electronic glidepath cursor 88. The cursor 88 represents the appropriate elevational glide path for landing of aircraft, and an elevation target 92 as seen in FIG. 5 ideally follows the cursor 88 as it moves from right to left. If the target 92 is above or below the cursor 88, the aircraft is respectively too high or too low, and the operator issues appropriate commands to the pilot in the case of actual aircraft or to the instructor where target generators are being used to bring the target onto the cursor 88.

Figure 6:
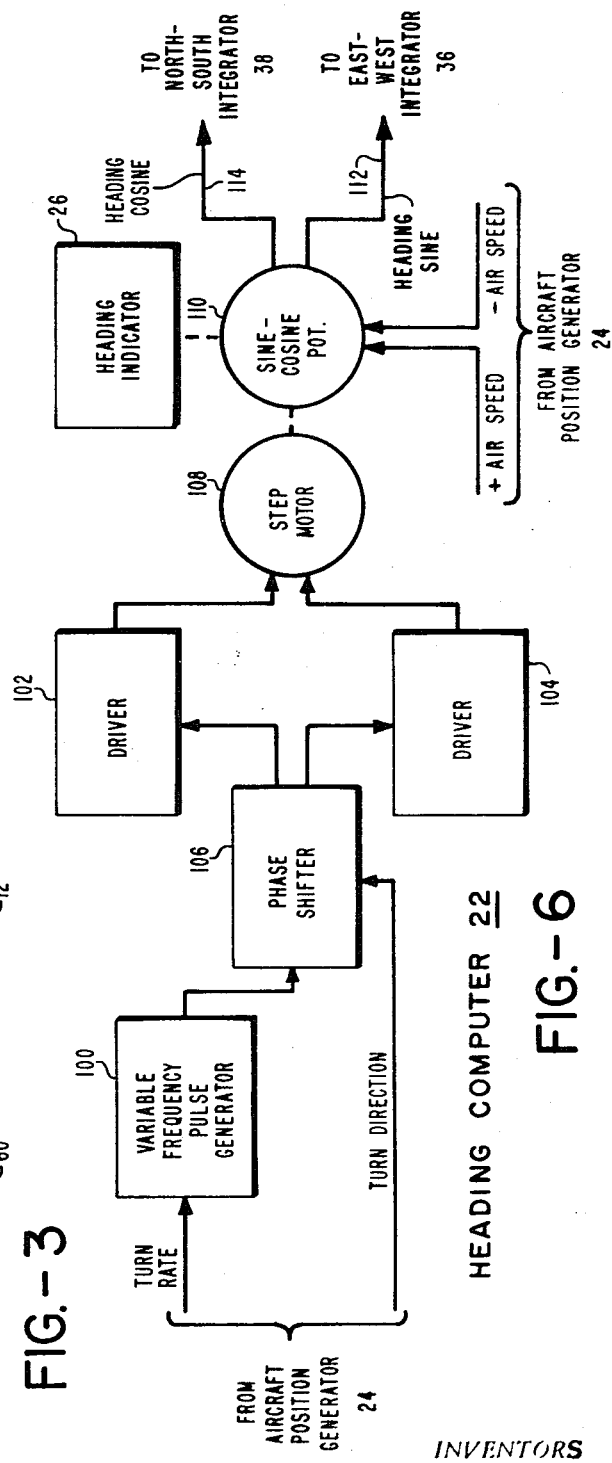
FIG. 6 is a block diagram of one preferred arrangement of a heading computer for use in the target generator of FIGS. 1 and 2.

One preferred arrangement of the heading computer 22 according to the invention is illustrated in FIG. 6. The turn rate signal from the aircraft position generator 24 in the form of a DC voltage is applied to a variable frequency pulse generator 100 which may comprise a unijunction oscillator or other appropriate circuit for conversion of the turn rate signal into a series of pulses having a repetition rate varying directly with the magnitude of the turn rate voltage. The pulses are applied to a pair of drivers 102 and 104 in the form of amplifiers via a phase shifter 106 which selectively shifts the phase of the pulses as a function of a direction command in the form of a turn direction signal from the aircraft position generator 24. The drivers 102 and 104 are coupled to a step motor 108 so as to drive the motor in opposite directions when pulses are applied thereto. Passage of pulses from the pulse generator 100 to the driver 102 by the phase shifter 106 results in driving the motor 108 in one direction, while pulses applied to the driver 104 by the phase shifter 106 drive the step motor 108 in the opposite direction.

When the turn rate voltage applied to the variable frequency pulse generator 100 is of zero value indicating that the aircraft is flying straight ahead, no pulses are applied to the step motor 108 and the motor 108 remains at rest. When the turn rate voltage assumes some value other than zero, the step motor 108 is continuously driven in the appropriate direction, the rate of stepping or rotation depending upon the frequency of the pulses from the generator 100 as determined by the turn rate voltage magnitude.

A sine-cosine potentiometer 110 is mechanically coupled to the step motor 108 such that the wiper arm thereof rotates as the step motor turns. Positive and negative air speed voltages from the aircraft position generator 24 are applied as input signals to the potentiometer 110, the positive air speed voltage being present when the aircraft is moving in one direction relative to the airport, and the negative voltage being present when the aircraft is flying in the opposite direction. A pair of output leads 112 and 114 are coupled to appropriate locations at the outer periphery of the potentiometer 110 so as to respectively provide signals representing the sine and cosine of the heading thereto. These signals are applied to the integrators 36 and 38 as previously described in connection with FIG. 1.

It will be appreciated by those skilled in the art that the use of a step motor to drive the sine and cosine computing potentiometer instead of the servo motor more typically used for such applications provides numerous advantages. The AC or DC servo motors typically used in prior art systems are subject to drift and oscillation as the input signals fluctuate. On the other hand step motors used according to the present invention are virtually drift free because of their basic nature and are not prone to oscillation during periods of frequent variations in the direction of turn. In this connection the nature of the step motor and its associated drive circuitry provide a threshold factor so as to tend to prevent unnecessary movement or oscillation of the motor for minor variations of the input signals. Moreover, as discussed hereafter the use of step motors for both the heading computer 22 and the bearing and range computer 20 enables a training exercise to be interrupted for critique or other reasons without loss os synchronization.

As previously mentioned in connection with the discussion of FIG. 1 the sine and cosine outputs of the heading computer 22 are integrated by the east-west and north-south integrators 36 and 38 to provide the X and Y position signals. According to the invention a wind circuit 116 shown in FIG. 1 and in more detail in FIG. 7 provides signals to the inputs of the integrators 36 and 38 so as to realistically simulate wind conditions which may be typically encountered. Wind velocity is selected by the arrangement shown in FIG. 7 which includes a wind speed potentiometer 120 and a wind direction or sine-cosine potentiometer 122. The potentiometer 120 is coupled between a power supply terminal 124 and ground so as to provide to the sine-cosine potentiometer 122 a signal of selected magnitude representing wind speed. The operator manually sets the position of the sine-cosine potentiometer 122 to choose the direction of the wind, and the potentiometer 122 responds by providing the sine and cosine of the wind direction. Accordingly, signals representing the speed of the wind in the east-west and north-south directions are provided by the potentiometer 122 to the integrators 36 and 38 via a pair of leads 126 and 128 respectively. The wind input signals to the integrators 36 and 38 combine with the heading sine and cosine signals from the heading computer 22 to realistically provide a wind factor which must be periodically compensated for during the training exercise as in the case of the air traffic control of actual aircraft.

A preferred arrangement of the bearing and range computer 20 according to the invention is shown in block diagram form in FIG. 8. The X and Y position signals from the integrators 36 and 38 represent the actual position of the aircraft, and are accordingly conveniently designated $X_A$ and $Y_A$. As previously mentioned, the computer 20 functions in response to the input position signals to initially determine in which one of four different quadrants the bearing lies. The reason for this may be better understood with reference to FIG. 9 which graphically depicts the X, Y coordinate system used.

As shown in FIG. 9, the coordinate system is conveniently divided into four different quadrants, the various boundaries of which form angles of 45° with the X and Y axes. The aircraft position may be conveniently assumed to be +1.0X when the bearing points directly to the east or along the +X axis, +1.0Y when the bearing points directly to the north or along the +Y axis, −1.0X when the bearing points directly to the west or along the −X axis, and −1.0Y when the bearing points directly to the south or along the −Y axis. Accordingly, when the bearing lies along the boundary between quadrants 1 and 2, the bearing is defined as +0.707X, +0.707Y. Similarly, when the bearing lies along the boundary between quadrants 2 and 3, it is defined as +0.707X, −0.707Y, when the bearing lies along the boundary between quadrants 3 and 4, it is defined as − 0.707X, −0.707Y, and when the bearing lies along the boundary between quadrants 1 and 4, it is defined as −0.707X, +0.707Y.

It will be noted that for quadrants 1 and 3 the absolute value of Y will always exceed the absolute value of X. Conversely, for quadrants 2 and 4 the absolute value of X will always exceed the absolute value of Y. Thus, the bearing may be determined to lie in quadrant 1 or 3 or in 2 or 4 by comparing the absolute values of $X_A$ and $Y_A$ to determine which is larger. If the absolute value of Y exceeds that of X so as to define the bearing as lying in quadrant 1 or 3, the particular quadrant may then be determined by considering the polarity or sign of $Y_A$, a positive $Y_A$ representing quadrant 1 and a negative $Y_A$ representing quadrant 3. Similarly, where the absolute value of X is found to exceed that of Y so as to determine that the bearing lies in quadrant 2 or 4, then a positive $X_A$ will indicate quadrant 2 and a negative $X_A$ will indicate quadrant 4.

Referring again to FIG. 8, the bearing and range computer 20 responds to $X_A$ and $Y_A$ to determine in which of the four quadrants the bearing lies by comparing the absolute values of $X_A$ and $Y_A$, then considering the sign of $X_A$ and $Y_A$. The input position signal $X_A$ is applied to a comparator 140 via an absolute value circuit 142 which provides a positive voltage of magnitude equal to that of $X_A$ to the comparator regardless of the polarity of $X_A$. The input signal $Y_A$ is also applied to the comparator 140 via an absolute value circuit 144 which also applies a positive voltage to the comparator for $Y_A$ of either polarity. The absolute value circuits 142 and 144 may assume any appropriate form such as the well-known arrangement in which a serially coupled pair of inverting amplifiers are diode clamped so as to have gain in only one direction.

The comparator 140 compares the absolute values $|X_A|+$ and $|Y_A|+$ and provides to a quadrant detector 146 a signal representing which of the two voltages is the larger. The input signals $X_A$ and $Y_A$ are also respectively applied to a pair of polarity detect circuits 148 and 150 which may comprise any appropriate form of circuitry such as bistable logic drivers and which provide to the quadrant detector 146 signals representing the polarity or sign thereof.

The quadrant detector 146 contains logic circuitry such as AND circuits arranged to determine the quadrant in which the bearing lies based on the input signals thereto. Thus, if the signal from the comparator 140 reflects that $|Y_A|+$ is greater than $|X_A|+$, the logic circuitry within the quadrant detector 146 determines that the bearing lies in quadrant 1 or 3. The quadrant detector 146 then determines based on the signal from the polarity detect circuit 150 whether the quadrant is 1 or 3. The quadrant detector 146 opens one of four different quadrant switches 152, 154, 156 and 158 depending upon whether the bearing lies in quadrant 1, 2, 3 or 4 respectively.

The input to each of the switches 152 and 156 representing quadrants 1 and 3 respectively comprises the output of an X summing network 160 which sums the input signal $X_A$ with a computed X position signal designated $X_C$. The input of each of the switches 154 and 158 representing quadrants 2 and 4 respectively comprises the output of a Y summing network 162 which sums the input signal $Y_A$ with a computed Y position signal designated $Y_C$. The outputs of the four quadrant switches 152, 154, 156 and 158 are coupled through a motor drive circuit 164 to drive a step motor 166 having a sine-cosine potentiometer 168 mechanically coupled thereto. The motor drive circuit 164 is similar to the driving arrangement for the step motor 108 in FIG. 6 in that it includes a variable frequency pulse generator, a phase shifter and a pair of drivers. The drive circuit 108 also includes circuitry for determining, based on the sense of the difference signal appearing at the output of the opened one of the switches 152, 154, 156 and 158, the direction in which the step motor 166 is to be driven. The rate of incrementing or stepping of the motor 166 varies according to the repetition rate of pulses generated in response to the magnitude of the difference signal.

The sine-cosine potentiometer 168 receives an input signal in the form of positive and negative range voltages from a range integrator 170. A pair of output leads 172 and 174 are coupled to the potentiometer 168 at appropriate locations along the outer periphery thereof to provide the computed position signals $X_C$ and $Y_C$. The values of $X_C$ and $Y_C$ are determined both by the bearing as represented by the position of the potentiometer 168 and by the range as determined by the magnitude of the output voltages from the range integrator 170. The polarities of the signals $X_C$ and $Y_C$ are selected so as to oppose the polarities of the actual position signals $X_A$ and $Y_A$. A pair of absolute value circuits 176 and 178 respectively provide negative signals representing the absolute values of $X_C$ and $Y_C$ to a summing network 180 at the input of the range integrator 170. Inputs to the summing network 180 are also provided by positive signals from the absolute value circuits 142 and 144 respectively associated with $X_A$ and $Y_A$. The bearing indicator 32 is mechanically coupled to the sine-cosine potentiometer 168, and the range indicator 34 is coupled to the output of the range integrator 170.

It it is assumed that the step motor 166 has not been advanced so as to update the bearing and range, then the computed position signals $X_C$ and $Y_C$ will differ from the actual position signals $X_A$ and $Y_A$ providing a signal from the summing network 180 to the range integrator 170. The range integrator 170 responds to the difference signal at the output of the summing network 180 by integrating so as to update the range signal at the output thereof.

Depending upon which of the four quadrant switches 152, 154, 156 and 158 is open, the difference between actual and computed X position signals, $X_A - X_C$, or the difference between actual and computed Y position signals, $Y_A - Y_C$, is applied to the motor drive circuit 164 to cause stepping or advancement of the step motor 166 in an appropriate direction and by an amount dependent upon the magnitude of the difference. As the step motor 166 is advanced, the sine-cosine potentiometer 168 is repositioned so as to change the values of the computed position signals $X_C$ and $Y_C$. The step motor 166 is continuously stepped and the range voltage from the range integrator 170 changed as appropriate until the actual and computed position signals of X and Y cancel one another at the summing network 180 and a null balance is achieved.

It will be appreciated that the arrangement of FIG. 8 employs a feedback which takes into consideration both the bearing and the range. Thus even though the potentiometer 168 is properly set so as to reflect the proper bearing, the signals at the inputs of the X and Y summing networks 160 and 162 will not cancel one another unless the proper range signal is present at the output of the range integrator 170. Likewise, a null balance will not be achieved even with a proper range signal if the bearing potentiometer 168 is not properly positioned.

The reasoning behind use of the difference $X_A - X_C$ to drive the step motor 166 when in quadrants 1 and 3 and use of the difference $Y_A - Y_C$ to drive the step motor 166 when in quadrants 2 and 4 may be understood by again referring to FIG. 9. It will be noted that in quadrants 1 and 3 the absolute value of X may vary between 0.0X and 0.707X. Accordingly, X changes at a much greater rate than Y for quadrants 1 and 3, providing a larger feedback signal in the use of the X difference. Conversely, Y changes at a much greater rate than X for quadrants 2 and 4.

Again it will be appreciated by those skilled in the art that the use of a step motor in the bearing and range computer according to the present invention provides advantages similar to those discussed in connection with the use of a step motor in the heading computer 22.

Referring again to FIG. 1 it will thus be seen that a training exercise may be interrupted simply by uncoupling the inputs to the altitude integrator 30, the east-west integrator 36 and the north-south integrator 38. With the vertical speed signal temporarily blocked at the input of the altitude integrator 30, the Z position or altitude signal is held at its present value. The step motor 108 within the heading computer 22 remains at rest to hold the heading fixed. The integrators 36 and 38 hold the X and Y position signals fixed at the value assumed upon initiation of interrupt so as to hold the step motor 166 within the bearing and range computer 20 at rest. With the motor 166 at rest the range integrator 170 within the bearing and range computer 20 stops integrating. Accordingly the computed bearing and range signals remain fixed during interrupt of the exercise. When the training exercise is to again be commenced the input signals are again coupled to the integrators 30, 36 and 38 and computation of the various signal values continues.

In addition to the sine-cosine potentiometer 168, the step motor 166 is also mechanically coupled to a second sineicosine potentiometer 182 and to a PAR heading potentiometer 184. As in the case of the sine-cosine potentiometer 168, the sine-cosine potentiometer 182 is appropriately positioned by the step motor 166 so as to provide bearing information in the form of the search bearing sine and search bearing cosine to the range voltage conditioner and search angle gate generator 40 shown in FIG. 2. The PAR heading potentiometer 184 provides the azimuth position signal to the PAR angle gate generator 56 shown in FIG. 2.

Figure 11:
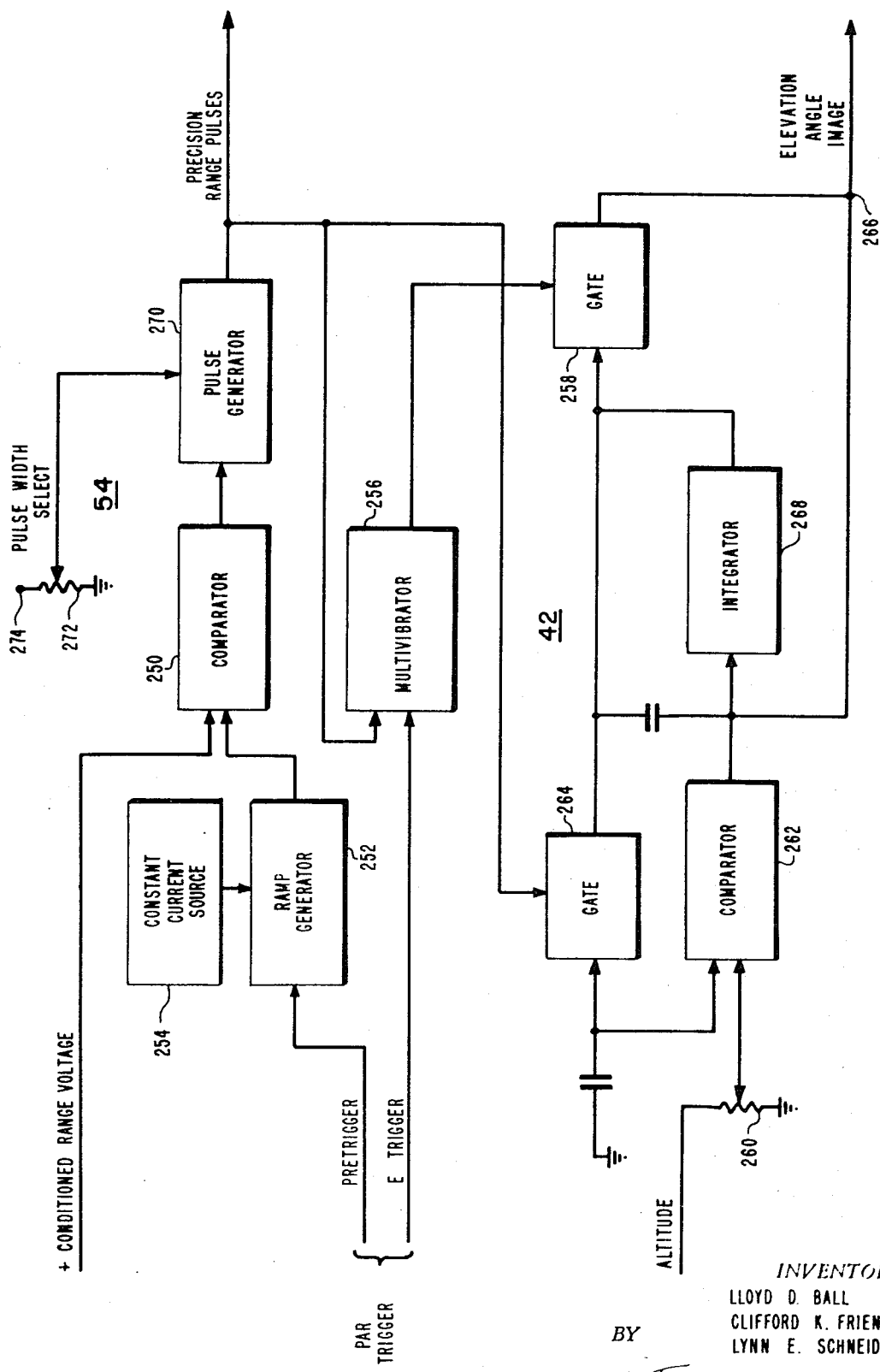
FIG. 11 is a block diagram of one preferred arrangement of a PAR range pulse generator and elevation angle computer and pulse width select circuit for use in the target generator of FIGS. 1 and 2.

The details of one preferred embodiment of the arrangement of FIG. 2 are illustrated in FIGS. 10–13. FIG. 10 illustrates the range voltage conditioner and search angle gate generator 40 and the scintillation circuit 44. FIG. 11 illustrates the PAR range pulse generator and elevation angle computer 42 together with the associated pulse width select circuit 54. FIG. 12 illustrates the PAR angle gate generator 56 FIG. 13 illustrates the video circuits 48 together with the associated pulse width select circuit 50, the target size circuit 52 and the SIF select circuit 58.

Referring to FIG. 10, the positive range voltage at the output of the range integrator 170 of the FIG. 8 arrangement is applied to a buffer amplifier 200 via a potentiometer 202 for amplification to a desired value prior to being passed as the positive conditioned range voltage to the PAR range pulse generator and elevation angle computer 42 and to the search range pulse generator within the video circuits 48. The positive conditioned range voltage as amplified by the buffer amplifier 200 is also inverted by an inverter 204 to provide the negative conditioned range voltage which is passed to the video circuits 48 to control the width of both ASR and PAR targets. Since the positive range voltage at the buffer amplifier 200 input grows larger with increasing range, the negative conditioned range voltage at the output of the inverter 204 increases or becomes more negative with range. The resulting negative conditioned range voltage as applied to the video circuits 48 causes the size of the targets to vary inversely with range, thereby simulating an effect commonly present in actual radar systems. In such actual systems it is not uncommon for the target size to vary as much as 12 decibels per octave.

The scintillation circuit 44 which includes a blocking oscillator 206 and associated potentiometer 208 provides random amplitude modulation in the form of a constantly varying signal which is added to the range voltage from the buffer amplifier 200 as applied to the input of the inverter 204. Frequently when a target appears on the radar displays shown in FIGS. 4 and 5, intensity will vary from one sweep thereof to the next. This phenomenon is commonly known as target amplitude scintillation. To realistically simulate scintillation the blocking oscillator 206 operates in non-synchronous fashion so as to generate constantly and randomly varying signals which are selectively adjusted in value by the potentiometer 208. These signals produce constant changes in the negative conditioned range voltage to produce variations in the intensity of the targets, as will be better appreciated from the discussion of FIG. 13 to follow.

The search bearing sine and cosine provided by the second sine-cosine potentiometer 182 shown in FIG. 8 are respectively amplified by buffer amplifiers 210 and 212 prior to being applied to comparators 214 and 216. The sine and cosine comprising the search antenna position from the radar antenna assembly or antenna simulator 46 of FIG. 2 are also applied to the comparators 214 and 216. The outputs of the quadrant 1 and 3 switches 152 and 153 of FIG. 8 are applied to an enabling input to the comparator 214, and the outputs of the quadrant 2 and 4 switches 154 and 158 are applied as an enabling input to the comparator 216. The comparison of the bearing sine and cosine as provided by the bearing and range computer 20 with the sine and cosine of the radar search antenna position is a convenient way of providing a search angle gate each time the sweep of the ASR radar indicator encounters the position of the simulated target. If the heading lies in quadrant 1 or 3, the comparator 214 is enabled and the res-pective sines are compared to produce the search angle gate whenever the sines are substantially equal in value. Similarly, when the bearing lies in quadrant 2 or 4, the comparator 216 is enabled so as to compare the respective cosines and provide the search angle gate when equality is reached. As shown in FIG. 10 the search angle gate as provided by the comparator 214 or the comparator 216 comprises a generally pulse-like waveform.

It will be appreciated from the depiction of a typical search angle gate in FIG. 10 and from subsequent discussion that a comparison of the sine and cosine values from the bearing and range computer 20 with those values derived from the antenna synchro data provides for the generation of highly realistic targets. The shape of the search angle gate is such that the targets produced thereby have heights which increase inwardly from the opposite ends to a maximum value at the center, just as in the case of targets produced by actual aircraft. On the other hand targets produced by a digital computer, for example, are typically rectangular in shape and are thus readily detected even by the inexperienced controller as a target generator produced target and not an actual aircraft produced target.

Referring to FIG. 13, the negative conditioned range voltage at the output of the inverter 204 shown in FIG. 10 is applied to a pair of gates 220 and 222 respectively associated with the ASR radar indicator 14 and the PAR radar indicator 16. The search angle gate at the output of the comparators 214 and 216 of the FIG. 10 arrangement is applied as a second input of the gate 220. A third input of the gate 220 comprises the output of the target size circuit 52 consisting of a potentiometer 224 coupled between a power supply terminal 226 and ground. The three inputs to the gate 220 selectively control the passage of pulses appearing at the output of a search range pulse generator 228 to the ASR radar indicator 14 via an amplifier 230 as the simulated target. Each of the gates 220 and 222 includes a resistive summing network at the input for algebraically combining the negative conditioned range voltage and the target size signal with the angle gates to vary the level of the angle gates. The angle gate within each gate 220 and 222 as so modified is applied to a field effect transistor within the gate to determine both the size and intensity of the target in accordance with the level thereof by adjusting the amplitude and length of groups of range pulses applied to the gate.

The search range pulse generator 228 which is identical to the PAR range pulse generator part of the computer 42 described in detail in connection with FIG. 11 responds to the ASR trigger signals from the radar antenna assembly or antenna simulator 46 shown in FIG. 2, to a signal from the pulse width select circuit 50 which comprises a potentiometer 232 coupled between a power supply terminal 234 and ground and to the positive conditioned range voltage to generate search range pulses in timed relation with the ASR trigger. The potentiometer 232 is positioned to select the width of the search range pulses which are applied to the gate 220 and to a gate 236 within the IFF interrogate circuit 58. Since the ASR trigger occurs many times during each sweep of the radar antenna, a plurality of the search range pulses are successively generated during each sweep of the radar antenna with only a small portion thereof being gated to the amplifier 230 as the target during each sweep.

The IFF interrogate circuit 58 includes the gate 236 and a switch 238 for conditioning the gate 236 when an IFF interrogation function is desired. With the switch 238 closed, the gate 236 passes a group of the search range pulses equivalent to maximum target width and increased intensity to the output of the gate 220 for combination with the pulses at the gate 220 to provide an ASR target of maximum width and increased intensity, thereby realistically simulating the response of an interrogated transponder. Upon opening the switch 238, the gate 236 is disabled and operation of the gating circuitry returns to normal.

The overall size of the ASR radar indicator target for different ranges is determined by the setting of the potentiometer 224 within the target size circuit 52. Thus the output of the potentiometer 224 combines with the negative conditioned range voltage to adjust the level of the search angle gate and the PAR angle gate at the different gates 220, 222. The negative conditioned range voltage increases with increasing range and vice versa to vary the target size in inverse relation to range. Thus as the range decreases, the negative conditioned range voltage grows smaller thereby raising the levels of the search angle and PAR angle gates and increasing the width of the targets. Constant variations in the amplitude of the negative conditioned range voltage provided by the scintillation circuit 44 cause constant variations in height of the search angle and PAR angle gates and thereby the intensity of the resulting ASR and PAR targets.

Referring to FIG. 11 the positive conditioned range voltage at the output of the buffer amplifier 200 of the range voltage conditioner and search angle gate generator 40 of FIG. 10 is passed to the PAR range pulse generator and elevation angle computer 42 by application to one of the inputs of a comparator 250. The other input of the comparator 250 is provided by a ramp generator 252 which is fed by a constant current source 254 and which is responsive to each pretrigger pulse in the PAR trigger information to begin the generation of a signal of ramp waveform. Shortly after the occurrence of the pretrigger pulse, an E trigger pulse within the PAR trigger changes the state of a multivibrator 256 so as to open a gate 258 to commence operation of the elevation angle computer portion of the circuit.

The altitude signal from the altitude integrator 30 shown in FIG. 1 is applied via a potentiometer 260 to one of the inputs of a comparator 262 having a second input coupled between a gate 264 and ground. The comparator 262 adjusts the altitude signal in accordance with a reference as provided by the other input and applies the adjusted altitude signal to an output terminal 266 via an integrator 268 and the gate 258. The integrator 268 responds to the adjusted altitude signal at the output of the comparator 262 by integrating the signal as a function of time. The output signals from the integrator 268 and the ramp generator 252 both increase with time until the ramp waveform at the input of the comparator 250 equals the conditioned range voltage, at which point a pulse generator 270 is caused to generate a range pulse having a width controlled by the pulse width select circuit 54. The pulse width select circuit 54 comprises a potentiometer 272 coupled between a power supply terminal 274 and ground. The generated range pulse is applied to the other input of the multivibrator 256 to change the state of the multivibrator and to close the gate 258 and stop the operation of the elevation angle computer portion of the circuit. At this instant the signal at the output terminal 266 or elevation angle image comprises a DC voltage the magnitude of which represents the angle between the hypotenuse and the range leg of a right triangle having a horizontal leg defining range and a vertical leg at a right angle thereto defining elevation. A new precision range pulse is generated each time a new PAR trigger becomes available, the PAR trigger as previously noted occurring many times during each sweep of the radar indicator and as a function of the frequency of movement of the antenna. Each time a new precision range pulse is generated, the elevation angle image is updated by the elevation angle computer.

The range pulses at the output of the pulse generator 270 are applied to the gate 222 in the video circuits 48 shown in FIG. 13 where they are gated to the output as the PAR target under the control of the target size circuit 52, the negative conditioned range voltage and the PAR angle gate which is generated by the PAR angle gate generator 56 of FIG. 12. The elevation angle image at the output terminal 266 is applied to the PAR angle gate generator 56.

Referring to FIG. 12 it will be seen that the elevation angle image is applied to a comparator 280 within an elevation portion 282 of the PAR angle gate generator 56 and to a comparator 284 within an azimuth portion 286 of the PAR angle gate generator 56. The comparator 280 compares the elevation angle image with the azimuth-elevation angle voltage from the radar antenna assembly so as to provide a signal to one input of a comparator 288 when the two inputs are substantially equal. The other input of the comparator 288 comprises the output of a comparator 292 as inverted by an inverter 296 and as adjusted by the elevation IF gain. The azimuth position signal provided by the PAR heading potentiometer 184 in the bearing and range computer 20 of FIG. 8 is applied to one input to a comparator 290 within the azimuth portion 286 of the PAR angle gate generator 56 and to one input of the comparator 292 in the elevation portion 282 of the PAR angle gate generator 56. The other input of the comparator 290 comprises the azimuth-elevation angle voltage, while the other input of the comparator 292 comprises the elevation servo data from the radar antenna assembly or antenna simulator. The azimuth servo data from the radar antenna assembly or antenna simulator is applied as a second input of the comparator 284. The comparator 290 functions in a manner similar to the comparator 280 to compare the azimuth position signal to the azimuth-elevation angle voltage and to provide an output signal which is coupled to one input of a comparator 294. The other input of the comparator 294 is provided by the output of the comparator 284 as inverted by an inverter 298 and as adjusted by the azimuth IF gain.

The output of the comparator 288 provides the PAR angle gate in terms of elevation, while the output of the comparator 294 provides the PAR angle gate in terms of azimuth. Since the radar antenna assembly generates elevation and azimuth information in alternating fashion, the azimuth-elevation relay gate therefrom is employed to alternately clamp one or the other of the outputs of the comparators 288 and 294 so that only one of the comparator outputs at a given time can provide the PAR angle gate.

The comparators 292 and 384 and associated inverters 296 and 298 perform a servo function by insuring that the circuit stays within the limits of the relatively narrow three-dimensional corridor, the length of which is defined by the range, the width of which is defined by the precision radar azimuth range shown in FIG. 4, and the height of which is defined by the elevation at the given range.

Thus if the radar antenna assembly is providing azimuth information such that the azimuth-elevation relay gate clamps the output of the comparator 288 and not the output of the comparator 294, the PAR angle gate is provided by the comparator 294. The azimuth position signal at the input of the comparator 290 as provided by the PAR heading potentiometer 184 within the bearing and range computer 20 of FIG. 8 assumes an essentially constant value since the value of the PAR heading can experience little if any change during the relatively small time required to generate the PAR angle gate. The azimuth-elevation angle voltage which changes as a function of the position of the radar antenna assembly gradually increases until it equals the azimuth position signal, at which point a signal of pulse-like waveform is provided at the output of the comparator 290 as shown in FIG. 12. At the same time the azimuth servo data is compared with the elevation angle image by the comparator 284 until equality is reached, at which time a resulting output signal of like waveform to the signal at the output of the comparator 290 is produced and inverted by the inverter 298 to provide the second input to the comparator 294. The resulting unclamped output of the comparator 294 comprises the PAR angle gate.

The elevation and azimuth IF gains respectively adjust the second inputs of the comparators 288 and 294 to provide IF gain control in the same manner as the azimuth IF gain is used in the FIG. 10 arrangement.

The PAR angle gate provided by the PAR angle gate generator 56 of FIG. 12 is applied to one input of the gate 222 shown in the video circuits 48 of FIG. 13. As in the case of the simulated ASR radar target provided by the gate 220 and the amplifier 230, the gate 222 and associated amplifier 300 function to provide a simulated target the the PAR radar indicator 16. The gate 222 passes selected groups of the successively generated precision range pulses from the PAR range pulse generator and elevation angle computer 42 of FIG. 11 to the output as the simulated PAR target signal under the control of the PAR angle gate, the conditioned range voltage, and the target size circuit 52. As in the case of the gate 220, the target size and negative conditioned range voltage combine to vary the level of the PAR angle gate at the gate 222 input thereby adjusting the width and intensity of the resulting PAR target.

It will be seen from the discussion thus far that in accordance with a preferred embodiment of the target generator 10 according to the invention simulated target signals for both ASR and PAR radar indicators are simultaneously and independently generated. Thus as seen in FIG. 14 the target generator 10 is coupled through the interface junction box 60 (omitted from FIG. 2) to both the ASR radar indicator 14 and the PAR radar indicator 16. Signals provided by the target generator 10 to represent a simulated aircraft are provided to the radar indicators 14 and 16 for simultaneous and independent display thereof. The radar antenna assembly 64 is coupled through the interface junction box 60 to the target generator 10 to provide the necessary synchro and other data.

In accordance with an alternative arrangement according to the invention a pair of the target generators 10 may be employed to respectively generate ASR and PAR target signals with one of the target generators, typically that generator used to generate the PAR target signal, being slaved to the other target generator. As shown in FIG. 15 an ASR target generator 10 is initially utilized to provide only the ASR target signal to the ASR radar indicator 14. The PAR target generator 10 is coupled to the ASR target generator 10 so as to function in a slaving mode. When in the slaving mode the target generator does not function except to receive X, Y and Z inputs from the other target generator. Accordingly, when the target generator 10 shown in FIG. 1 is set to operate in the slaving mode, the X, Y and Z position signals from the other target generator are directly applied to the east-west integrator 36, the north-south integrator 38 and the altitude integrator 30 respectively. The respective integrators respond to the input position signals causing the target generator to operate in the same manner as if the various position signals had been derived from the heading computer 22 and the aircraft position generator 24. When the training exercise reaches a point at which the simulated aircraft target is within the range of the PAR radar indicator 16 and it is desired that the PAR radar indicator 16 be used for purposes of final approach and landing, the PAR target generator 10 is switched from the slaving mode of operation to the normal or "fly" mode in which event the PAR target generator 10 continues to generate target signals just as though it had been generating such signals since the initial commencement of the training exercise.

Occasionally it may be desirable to use one or more target generators 10 to generate simulated aircraft targets in accordance with a predetermined or prerecorded flight course. This feature is useful where typical air traffic control situations are to be duplicated such that a plurality of different targets appear on each radar indicator. Thus where the student is assigned the responsibility for a particular simulated air-craft being displayed on one or more radar indicators through use of a target generator 10, it may be desirable to simulate typical air traffic conditions by causing targets representing other aircraft to also appear on the radar indicators. It may also be desirable in some instances to be able to run a prerecorded exercise from start to finish without direct participation by the student in order to illustrate to the student one or more desired flight courses for different situations. Such arrangements are made possible in accordance with the invention as shown in FIG. 16. A first target generator 10 is caused to generate simulated aircraft targets following a desired flight course while the X, Y and Z position signals therefrom as derived at the outputs of the integrators 36, 38 and 30 shown in FIG. 1 are simultaneously recorded on a multitrack magnetic tape using a conventional magnetic tape recorder 310. Thereafter a second target generator 10 is switched to the slaving mode of operation, and the recorded X, Y and Z position signals are read and applied to the integrators thereof causing the second target generator 10 to operate in the manner described in connection with the PAR target generator 10 of FIG. 15.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A target generator for generating signals representing the heading, bearing and range of a simulated aircraft in response to turn rate, air speed and vertical speed signals comprising:
   first integrating means for integrating the vertical speed signal to provide an altitude signal;
   heading computer means responsive to the turn rate and air speed signals for generating a pair of signals representing speed of the aircraft in X and Y directions, the heading computer means including means responsive to the air speed signal for providing the sine and cosine of the heading in accordance with the position thereof, step motor means coupled to change the position of the means for providing the sine and cosine in response to incremental advancement thereof, the step motor means being incrementally advanced in response to a series of pulses, and means for applying to the step motor means a series of pulses having a repetition rate dependent on the value of the turn rate signal;
   second integrating means for integrating the signals representing speed of the aircraft in X and Y directions to provide actual X and Y position signals; and
   bearing and range computer means responsive to the actual X and Y position signals for generating a signal representing the range of the aircraft, the bearing and range computer means including means responsive to the range signal for providing computed X and Y position signals in accordance with the position thereof, step motor means coupled to change the position of the means for providing the computed X and Y position signals in response to incremental advancement thereof, the step motor means being incrementally advanced in response to a series of pulses, means for applying to the step motor means a series of pulses having a repetition rate directly related to the difference between the actual and computed X position signals or the actual and computer Y position signals as determined by an initial determination of the angular range in which the aircraft bearing lies, and means responsive to the actual and computed X and y position signals for providing the range signal in accordance with differences therebetween.

2. A target generator in accordance with claim 1, further including means for providing to the second integrating means signals representing the speed of simulated wind in the X and Y direction.

3. A target generator in accordance with claim 1, further including exercise interrupt means for selectively blocking the vertical speed signal from the first integrating means and the signals representing speed of the aircraft in X and Y directions from the second integrating means.

4. In a target generator in which a signal is provided to represent the turn rate of a simulated aircraft, an arrangement for computing the heading of the simulated aircraft comprising:
   potentiometer means representing the heading of the simulated aircraft in accordance with the position thereof;
   step motor means coupled to change the position of the potentiometer means in response to incremental advancement of the motor means;
   means responsive to the turn rate signal for generating an alternating waveform signal having a frequency varying in direct relation to the value of the turn rate signal; and
   means responsive to the alternating waveform signal for incrementally advancing the step motor means in accordance with the frequency of the alternating waveform.

5. An arrangement according to claim 4, wherein the turn rate signal comprises a DC voltage, the alternating waveform signal comprises a series of pulses having a repetition rate varying in direct relation to the magnitude of the DC voltage, and the means for incrementally advancing the step motor provides an incremental advancement of the motor in response to each pulse of the pulse series.

6. In a target generator in which signals are provided to represent the actual X and Y positions of a simulated aircraft relative to an X, Y coordinate reference system, an arrangement for computing the bearing and range of the aircraft comprising:
   means responsive to the actual X and Y position signals for determining the particular one of a plurality of different quadrants of the coordinate reference system in which the aircraft bearing lies;

means including potentiometer means for providing computed X and Y position signals in accordance with the position of the potentiometer means;

step motor means coupled to change the position of the potentiometer means in response to incremental advancement of the step motor means; and means for incrementally advancing the step motor means in accordance with differences between the actual and computed X position signals when the aircraft bearing is determined to lie in selected ones of the different quadrants and in accordance with differences between the actual and computed Y position signals when the aircraft bearing is determined to lie in other than the selected ones of the different quadrants.

7. An arrangement according to claim 6, wherein the means for providing computed X and Y position signals includes means for generating a signal representing the range of the aircraft, the range signal being applied as an input signal to the potentiometer means, and means responsive to differences between the actual and computed X and Y position signals for changing the value of the generated range signal.

8. An arrangement according to claim 6, wherein the means for incrementally advancing the step motor means includes means responsive to the difference between the actual and computed X or Y position signals for generating an alternating waveform signal having a frequency varying in direct relation to the value of the difference, and means responsive to the alternating waveform signal for incrementally advancing the step motor means in accordance with the frequency of the alternating waveform.

9. An arrangement according to claim 6, wherein the quadrant determining means includes means responsive to the actual X and Y position signals for comparing the signals to determine which has the greater absolute value, first logic means responsive to the comparing means for determining which two of the plurality of different quadrants must include the aircraft bearing, and second logic means responsive to the actual X and Y position signals for selecting one of the two quadrants determined by the first logic means in accordance with the signs of the actual X and Y position signals.

10. An arrangement according to claim 6, wherein the plurality of different quadrants comprises first, second, third and fourth quadrants, and the means for incrementally advancing the step motor means advances the step motor means in accordance with the difference between the actual and computed X position signals when the aircraft bearing is determined to lie in the first or third quadrant and in accordance with the difference between the actual and computed Y position signals when the aircraft bearing is determined to lie in the second or fourth quadrant.

11. An arrangement for simultaneously providing radar displays of actual and simulated aircraft target signals comprising:

a radar antenna assembly for scanning actual aircraft and operative to provide signals representing the position of the actual aircraft relative thereto and synchro data signals representing the scanning;

radar indicator means responsive to aircraft position signals at the input thereof to provide a visual display of air-craft targets represented by the signals;

at least one target generator responsive to external command signals to generate signals representing the position of a simulated aircraft; and a junction box coupling together the radar antenna assembly, the radar indicator means and the target generator to simultaneously provide the aircraft position signals to the input of the radar indicator means and the synchro data signals to the target generator, the junction box providing an interface for the target generator by altering the synchro data signals and other signals communicated between the target generator and the radar antenna assembly and radar indicator means in accordance with the characteristics of the radar antenna assembly and the radar indicator means.

12. An arrangement for providing a radar display of at least one simulated aircraft target comprising:

radar display means responsive to simulated aircraft position signals for providing a visual display of the simulated aircraft position represented thereby;

a first target generator coupled to the radar display means and capable of generating a signal representing the position of a simulated aircraft; and a second target generator coupled to the radar display means and capable of generating a signal representing the position of a simulated aircraft, the second target generator being coupled to the first target generator and being responsive to operation of the first target generator to continuously update a plurality of conditions stored in the second target generator and representing an aircraft simulated by the first target generator, the conditions stored in the second target generator being used by the second target generator to simulate the same aircraft simulated by the first target generator upon changing from the first target generator to the second target generator to simulate the aircraft.

13. An arrangement in accordance with claim 12, wherein the continuously updated plurality of different conditions within the second target generator include signal representations of the altitude of the simulated aircraft and the position of the simulated aircraft relative to an X, Y coordinate system.

14. An arrangement for providing a display of at least one simulated aircraft target comprising:

means for generating signals representing the constantly changing position of a radar antenna;

at least one target generator responsive to external commands and to signals representing the constantly changing position of a radar antenna to generate signals representing a simulated aircraft;

radar indicator means responsive to simulated aircraft signals to provide a visual target display thereof; and an interfacing junction box coupled to the radar antenna position signal generating means, the the target generator and the radar indicator means to provide the radar antenna position signals to the target generator and the simulated aircraft signals to the radar indicator means, the interfacing junction box altering the radar antenna position signals as well as other signals communicated into the target generator in accordance with known characteristics of the radar antenna position signal generating means and radar indicator means.

15. An arrangement in accordance with claim 14, wherein the means for generating signals representing the constantly changing position of a radar antenna comprises a radar antenna assembly.

16. An arrangement in accordance with claim 14, wherein the means for generating signals representing the constantly changing position of a radar antenna comprises a radar antenna simulator.

17. An arrangement in accordance with claim 14, wherein the interfacing junction box converts the signals representing the constantly changing position of a radar antenna into sine and cosine equivalents.

18. In a target generator having first and second integrators which integrate signals representing speed of a simulated aircraft in mutually perpendicular directions to provide signals representing the position of the simulated aircraft relative to the mutually perpendicular directions, the improvement comprising means for providing signals to the first and second integrators representing the speed of simulated wind in the mutually perpendicular directions.

19. The combination set forth in claim 18, wherein the means for providing simulated wind signals includes adjustable means for providing a signal representing the total speed of the simulated wind, and selectively adjustable potentiometer means coupled to each of the first and second integrators and responsive to the total speed signal to provide to each of the first and second integrators a portion of the total speed signal representing speed of the simulated wind in a different one of the mutually perpendicular directions.

20. An arrangement for generating target signals representing the flight of a simulated aircraft over a predetermined course comprising:
recording means for storing time varying signals representing the flight of the simulated aircraft over the predetermined course in terms of altitude, aircraft position relative to a first reference axis, and aircraft position relative to a second reference axis normal to the first reference axis; and
target generator means including bearing and range computer means responsive to the stored time varying position signals relating to the first and second reference axes for computing bearing and range of the simulated aircraft in accordance therewith, and means responsive to the computed bearing and range and to the stored time varying altitude signal for generating target signals therefrom.

21. A circuit for providing a simulated aircraft target signal to a search radar indicator in response to computed bearing and range signals and to radar antenna position signals comprising:
means for comparing the computed bearing and radar antenna position signals to generate a search angle gate;
means responsive to the computed range and radar antenna position signals for generating a succession of search range pulses in timed relation with radar antenna position; and
means for selectively gating the search range pulses to the search radar indicator as the simulated aircraft target signal under the control of the search angle gate.

22. A circuit in accordance with claim 21, further including means for providing a target signal of the simulated aircraft to a precision radar indicator substantially simultaneously with and independently of providing of the target signal to the search radar indicator, the precision radar target signal being provided in response to the computed range and radar antenna position signals and to a computed altitude signal, said means for providing the precision radar indicator target signal comprising means responsive to the computed range and radar antenna position signals for generating a succession of precision range pulses in timed relation with radar antenna position, means associated with the precision range pulse generating means and responsive to the computed altitude signal for generating an elevation angle image, means responsive to the elevation angle image and the computed bearing and radar antenna position signal for generating a PAR angle gate, and means for selectively gating the precision range pulses to the precision range indicator as the simulated aircraft target signal under the control of the PAR angle gate.

23. A circuit in accordance with claim 21, wherein the radar antenna position signals include an azimuth IF gain signal, and further including means associated with the search angle gate generating means for varying the width of the search angle gate in accordance with the azimuth IF gain signal.

24. A circuit in accordance with claim 21, wherein the computed bearing signal includes signals representing the sine and cosine thereof, the radar antenna position signals include signals representing the sine and cosine of radar antenna position, and the search angle gate generating means compares the computed bearing sine and cosine signals with the radar antenna position sine and cosine signals to provide the search angle gate.

25. A circuit in accordance with claim 24, wherein the computed bearing signal includes a signal representing that one of four different quadrants of a coordinate system in which the computed bearing lies, and wherein the search angle gate generating means includes first comparator means responsive to the quadrant signal for comparing the computed bearing sine and radar antenna position sine signals to provide the search angle gate when the computed bearing lies in either of two of the four different quadrants, and second comparator means responsive to the quadrant signal for comparing the computed bearing cosine and radar antenna position cosine signals to provide the search angle gate when the computed bearing lies in either of the other two of the four different quadrants.

26. A circuit in accordance with claim 21, further comprising means for conditioning the computed range signal including means for inverting the computed range signal and means for coupling the inverted range signal to the selective gating means, the inverted range signal combining with the search angle gate at the selective gating means to vary the width of the search angle gate inversely with range.

27. A circuit in accordance with claim 21, further including means for simulating amplitude scintillation of the simulated aircraft target.

28. A circuit in accordance with claim 27, wherein the scintillation means includes means for generating a randomly varying signal, means for combining the computed range signal with the randomly varying signal to produce a combined signal, and means for combining the combined signal with the search angle gate at the selective gating means to randomly vary the amplitude of the search angle gate.

29. A circuit in accordance with claim 21, further including means for modifying the simulated aircraft target to simulate the response of an interrogated transponder.

30. A circuit in accordance with claim 29, wherein the interrogated transponder response simulating means comprises second selective gating means operative in response to an external command to selectively gate the search range pulses to the output of the first-mentioned selective gating means, the gated search range pulses from the second selective gating means combining with the gated search range pulses from the first-mentioned selective gating means to provide the simulated aircraft target with maximum width.

31. A circuit for providing a simulated aircraft target signal to a precision radar indicator in response to computed bearing, range and altitude signals and to radar antenna position signals comprising:
  means responsive to the computed range and radar antenna position signals for generating a succession of precision range pulses in timed relation with radar antenna position;
  means associated with the precision range pulse generating means and responsive to the computed altitude signal for generating an elevation angle image;
  means responsive to the elevation angle image and the computed bearing and radar antenna position signals for generating a PAR angle gate; and
  means for selectively gating the precision range pulses to the precision radar indicator as the simulated aircraft target under the control of the PAR angle gate.

32. A circuit in accordance with claim 31, further comprising means for conditioning the computed range signal including means for inverting the computed range signal and means for coupling the inverted range signal to the selective gating means, the inverted range signal combining with the PAR angle gate at the selective gating means to vary the width of the PAR angle gate inversely with range.

33. A circuit in accordance with claim 31, wherein the radar antenna position signals include PAR pretrigger and trigger signals, and the precision range pulse generating means includes means responsive to each pretrigger signal to initiate the generation of a ramp signal, means for comparing the ramp signal with the computed range signal and for providing an output signal upon coincidence, and pulse generating means responsive to each output signal from the comparing means for providing a precision range pulse.

34. A circuit in accordance with claim 33, wherein the precision range pulse generating means includes bistable means coupled to be changed to a first state in response to each trigger signal and to a second state in response to the generation of each precision range pulse, and wherein the elevation angle image generating means includes integrating means coupled to integrate the computed altitude signal, and gating means coupled to the integrating means and responsive to the state of the bistable means to enable the integrating means to integrate when the bistable means is in the first state, the output of the integrating means providing the elevation angle image.

35. A circuit in accordance with claim 31, wherein the radar antenna position signals include an azimuth-elevation relay gate, and the PAR angle gate generating means includes separate elevation and azimuth portions respectively coupled to be clamped by the azimuth-elevation relay gate, the elevation portion providing the PAR angle gate when the azimuth-elevation relay gate indicates elevation and the azimuth portion providing the PAR angle gate when the azimuth-elevation relay gate indicates azimuth.

36. A circuit in accordance with claim 35, wherein the radar antenna position signals include azimuth-elevation angle voltage, elevation servo data and azimuth servo data, the elevation portion includes first comparator means for comparing the azimuth-elevation angle voltage and the elevation angle image, second comparator means for comparing the elevation servo data and the computed bearing signal, and third comparator means for comparing the output of the first comparator means with the output of the second comparator means as inverted to provide the PAR angle gate, and the azimuth portion includes fourth comparator means for comparing the azimuth-elevation angle voltage and the computed bearing signal, fifth comparator means for comparing the azimuth servo data and the elevation angle image, and sixth comparator means for comparing the output of the fourth comparator means with the output of the fifth comparator means as inverted to provide the PAR angle gate.

37. A circuit in accordance with claim 36, wherein the radar antenna position signals include elevation IF gain and azimuth IF gain, the elevation portion includes means for varying the inverted output of the second comparator means in accordance with the elevation IF gain, and the azimuth portion includes means for varying the inverted output of the fifth comparator means in accordance with the azimuth IF gain.

38. An arrangement for interfacing a target generator with a radar system having an antenna and a target indicator, said arrangement including a junction box, means coupling the antenna to the target generator through the junction box, and means coupling the target indicator to the target generator through the junction box, the junction box being operative to modify signal information communicated between the target generator and the radar system in accordance with known characteristics of the radar system to interface the radar system to the target generator.

39. A target generator for generating signals representing the heading, bearing and range of a simulated aircraft in response to turn rate, air speed and vertical speed signals comprising:
  first integrating means for integrating the vertical speed signal to provide an altitude signal;
  heading computer means responsive to the turn rate and air speed signals for generating a pair of signals representing speed of the aircraft in X and Y directions, the heading computer means including means responsive to the turn rate signal for providing a value which is incrementally changed at a rate determined by the turn rate signal, and means responsive to the air speed signal and to said value for providing the sine and cosine of the heading;

second integrating means for integrating the sine and cosine of the heading to provide X and Y position signals; and bearing and range computer means responsive to the X and Y position signals for generating a signal representing the bearing and range of the aircraft and including means providing a representation of bearing, said representation being incrementally changed in accordance with the relative values of the X and Y position signals, and means responsive to the bearing representation and to the X and Y position signals for computing range.

40. A target generator in accordance with claim 39, wherein the means for providing a value includes means for generating pulses having a repetition rate determined by the turn rate signal and means for providing a representation of the value, the means for providing a representation of the value being responsive to the pulses to change by an increment in response to each pulse and in a sense determined by the turn direction signal.

41. A target generator in accordance with claim 39, wherein the means for providing a representation of bearing includes means for comparing the X and Y position signals.

42. In a target generator in which a signal is provided to represent the turn rate of a simulated aircraft, an arrangement for computing the heading of the simulated aircraft comprising:

means responsive to the turn rate signal for generating an alternating waveform signal having a frequency varying in direct relation to the value of the turn rate signal;

means for storing a value representing the heading; and means responsive to the alternating waveform signal for incrementally advancing said value representing the heading in accordance with the frequency of the alternating waveform.

43. An arrangement according to claim 42, wherein the turn rate signal comprises a DC voltage, the alternating waveform signal comprises a series of pulses having a repetition rate varying in direct relation to the magnitude of the DC voltage, and said value representing the heading is changed by one increment in response to each pulse of the pulse series.

44. In a target generator in which signals are provided to represent the X and Y positions of a simulated aircraft relative to an X, Y coordinate reference system, an arrangement for computing the bearing of the aircraft comprising:

means responsive to the X and Y position signals for determining the particular one of a plurality of different quadrants of the coordinate reference system in which the aircraft bearing lies;

means providing a value representing the bearing, said value being chosen from a plurality of different values differing from one another by incremental amounts; and means for incrementally changing the value representing the bearing in accordance with changes in the X position signal when the bearing is determined to lie in certain ones of the quadrants and in accordance with changes in the X position signal when the bearing is determined to lie in certain other ones of the quadrants.

45. An arrangement according to claim 44, wherein the quadrant determining means includes means responsive to the X and Y position signals for comparing the signals to determine which has the greater absolute value, first logic means responsive to the comparing means for determining which two of the plurality of different quadrants must include the aircraft bearing, and second logic means responsive to the X and Y position signals for selecting one of the two quadrants determined by the first logic means in accordance with the signs of the X and Y position signals.

46. A circuit in accordance with claim 22, further including means associated with the search angle gate generating means for varying the width of the search angle gate to simulate desired target effects.

* * * * *